US007795333B2

(12) United States Patent
Wood et al.

(10) Patent No.: US 7,795,333 B2
(45) Date of Patent: *Sep. 14, 2010

(54) GRAFTED CYCLODEXTRIN

(75) Inventors: Willard E. Wood, Arden Hills, MN (US); Neil J. Beaverson, Vadnais Heights, MN (US); Kasyap V. Seethamraju, Eden Prairie, MN (US)

(73) Assignee: Cellresin Technologies, LLC, St. Paul, MN (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/403,480

(22) Filed: Apr. 13, 2006

(65) Prior Publication Data

US 2006/0183857 A1 Aug. 17, 2006

Related U.S. Application Data

(62) Division of application No. 10/672,297, filed on Sep. 25, 2003, now Pat. No. 7,166,671.

(60) Provisional application No. 60/432,523, filed on Dec. 10, 2002.

(51) Int. Cl.
*C08B 37/00* (2006.01)
*C08F 267/04* (2006.01)

(52) U.S. Cl. ....................... 524/48; 525/54.21; 525/285

(58) Field of Classification Search .................. 524/48; 525/54.21, 285
See application file for complete search history.

(56) References Cited

U.S. PATENT DOCUMENTS 3,318,972 A 5/1967 Kern Mertzweiller et al.
3,365,750 A 1/1968 Donald
3,400,190 A 9/1968 Donald
3,440,686 A 4/1969 Corbett
3,476,627 A 11/1969 Squires
3,477,099 A 11/1969 Lee et al.
3,479,425 A 11/1969 Lefevre et al.
3,524,795 A 8/1970 Peterson
3,557,265 A 1/1971 Chisholm et al.
3,583,032 A 6/1971 Stafford
4,045,833 A 9/1977 Mesek et al.
4,068,666 A 1/1978 Shiff
4,100,324 A 7/1978 Anderson et al.
4,190,477 A 2/1980 Ossian et al.
4,203,435 A 5/1980 Krull et al.
4,275,811 A 6/1981 Miller
4,321,977 A 3/1982 Tenn
4,382,507 A 5/1983 Miller
4,405,667 A 9/1983 Christensen et al.
4,407,873 A 10/1983 Christensen et al.
4,407,874 A 10/1983 Gehrke
4,407,897 A 10/1983 Farrell et al.
4,410,578 A 10/1983 Miller
4,720,415 A 1/1988 Vander Wielen et al.
4,722,815 A 2/1988 Shibanai
4,725,657 A 2/1988 Shibanai
4,753,832 A 6/1988 Brown et al.
4,777,088 A 10/1988 Thompson et al.
4,789,575 A 12/1988 Gibbons et al.
4,818,464 A 4/1989 Lau
4,833,202 A 5/1989 Dunn, Jr.
4,835,025 A 5/1989 Thompson et al.
4,859,513 A 8/1989 Gibbons et al.
4,880,701 A 11/1989 Gibbons et al.
4,888,222 A 12/1989 Gibbons et al.
4,921,733 A 5/1990 Gibbons et al.
4,929,476 A 5/1990 Gibbons et al.
4,940,464 A 7/1990 Van Gompel et al.
4,940,612 A 7/1990 Gibbons et al.
4,940,621 A 7/1990 Rhodes et al.
4,950,510 A 8/1990 Massouda
4,981,739 A 1/1991 Gibbons et al.
4,983,431 A 1/1991 Gibbons et al.
5,001,176 A 3/1991 Nakazima
5,019,073 A 5/1991 Roessler et al.
5,084,352 A 1/1992 Percec et al.
5,106,562 A 4/1992 Blemberg et al.
5,108,844 A 4/1992 Blemberg et al.
5,126,348 A 6/1992 McMurray
5,142,750 A 9/1992 Dyer et al.
5,173,481 A 12/1992 Pitha et al.
5,190,711 A 3/1993 Blemberg
5,213,881 A 5/1993 Timmons et al.
5,236,642 A 8/1993 Blemberg et al.
5,262,404 A 11/1993 Weisz et al.
5,276,088 A 1/1994 Yoshinaga
5,306,533 A 4/1994 Robichaud et al.
5,381,914 A 1/1995 Koyama et al.
5,433,982 A 7/1995 Yamada et al.

(Continued)

FOREIGN PATENT DOCUMENTS

CA 2 333 131 A1 12/1999

(Continued)

OTHER PUBLICATIONS

"Fiber Systems Technology Primer, An Introduction to Spunbond and Meltblown," *Nordson Fiber Systems*, pp. 1-13 (Date Printed Jul. 28, 2006).

(Continued)

*Primary Examiner*—Nathan M Nutter
(74) *Attorney, Agent, or Firm*—Pauly, DeVries Smith & Deffner, L.L.C.

(57) ABSTRACT

Thermoplastic polymer compositions, films, continues, closures, laminates can comprise a modified vinyl polymer said modified polymer having a moiety comprising a cyclodextrin compound. The cyclodextrin compound, locked into the polymer structure, can absorb impurities, permeants, or other undesirable volatile materials. The cooperation between the cyclodextrin grafted onto the thermoplastic polymer and the polymer structure can provide barrier properties to a film, web or other polymer structure. A permeant or a contaminant can be complexed or trapped within the polymer and held within the film or Web preventing the permeant or contaminant from passing into the interior of a container or enclosure.

15 Claims, 6 Drawing Sheets

U.S. PATENT DOCUMENTS

| | | | |
|---|---|---|---|
| 5,486,166 | A | 1/1996 | Bishop et al. |
| 5,492,947 | A | 2/1996 | Wood et al. |
| 5,508,075 | A | 4/1996 | Roulin et al. |
| 5,509,915 | A | 4/1996 | Hanson et al. |
| 5,516,766 | A | 5/1996 | Weisz et al. |
| 5,538,655 | A | 7/1996 | Fauteux et al. |
| 5,573,934 | A | 11/1996 | Hubbell et al. |
| 5,576,145 | A | 11/1996 | Keil et al. |
| 5,603,974 | A | 2/1997 | Wood et al. |
| 5,616,353 | A | 4/1997 | Wright et al. |
| 5,635,550 | A | 6/1997 | Dehennau et al. |
| 5,656,368 | A | 8/1997 | Braun et al. |
| 5,695,839 | A | 12/1997 | Yamada et al. |
| 5,696,186 | A | 12/1997 | Videau |
| 5,698,370 | A | 12/1997 | Keil et al. |
| 5,714,445 | A | 2/1998 | Trinh et al. |
| 5,725,917 | A | 3/1998 | Parks |
| 5,760,016 | A | 6/1998 | Djedaini-Pilard et al. |
| 5,773,518 | A | 6/1998 | Keil et al. |
| 5,776,842 | A | 7/1998 | Wood et al. |
| 5,816,487 | A | 10/1998 | Skinner |
| 5,837,339 | A | 11/1998 | Wood et al. |
| 5,874,419 | A | 2/1999 | Herrmann et al. |
| 5,882,565 | A | 3/1999 | Wood et al. |
| 5,904,929 | A | 5/1999 | Uekama et al. |
| 5,916,883 | A | 6/1999 | Shalaby et al. |
| 5,928,745 | A | 7/1999 | Wood et al. |
| 5,939,060 | A | 8/1999 | Trinh et al. |
| 5,942,452 | A | 8/1999 | Daponte et al. |
| 5,964,973 | A | 10/1999 | Heath et al. |
| 5,973,064 | A | 10/1999 | Zhao et al. |
| 6,001,343 | A | 12/1999 | Trinh et al. |
| 6,042,723 | A | 3/2000 | Duval et al. |
| 6,045,812 | A | 4/2000 | Richard et al. |
| 6,096,668 | A | 8/2000 | Abuto et al. |
| 6,110,158 | A | 8/2000 | Kielpikowski |
| 6,110,548 | A | 8/2000 | Kinsey |
| 6,149,993 | A | 11/2000 | Parks et al. |
| 6,177,607 | B1 | 1/2001 | Blaney et al. |
| 6,191,209 | B1 | 2/2001 | Andrews et al. |
| 6,193,827 | B1 | 2/2001 | Parks et al. |
| 6,204,256 | B1 | 3/2001 | Shalaby et al. |
| 6,207,599 | B1 | 3/2001 | Coolen et al. |
| 6,211,139 | B1 | 4/2001 | Keys et al. |
| 6,218,013 | B1 | 4/2001 | Wood et al. |
| 6,229,062 | B1 | 5/2001 | Mandell et al. |
| 6,238,284 | B1 | 5/2001 | Dittgen et al. |
| 6,248,363 | B1 | 6/2001 | Patel et al. |
| 6,264,864 | B1 | 7/2001 | Mackay |
| 6,267,985 | B1 | 7/2001 | Chen et al. |
| H2011 | H | 1/2002 | Freiburger et al. |
| 6,348,258 | B1 | 2/2002 | Topolkaraev et al. |
| 6,372,317 | B1 | 4/2002 | Denney et al. |
| 6,379,753 | B1 | 4/2002 | Soane et al. |
| 6,420,285 | B1 | 7/2002 | Newkirk et al. |
| 6,465,066 | B1 | 10/2002 | Rule et al. |
| 6,469,078 | B1 | 10/2002 | Simon et al. |
| 6,478,174 | B1 | 11/2002 | Grazia et al. |
| 6,559,081 | B1 | 5/2003 | Erspamer et al. |
| 6,583,331 | B1 | 6/2003 | McCormack et al. |
| 6,608,237 | B1 | 8/2003 | Li et al. |
| 6,613,703 | B1 | 9/2003 | Yahiaoui et al. |
| 6,632,209 | B1 | 10/2003 | Chmielewski |
| 6,663,584 | B2 | 12/2003 | Griesbach, III et al. |
| 6,663,611 | B2 | 12/2003 | Blaney et al. |
| 6,682,512 | B2 | 1/2004 | Uitenbroek et al. |
| 6,689,378 | B1 | 2/2004 | Sun et al. |
| 6,709,746 | B2 | 3/2004 | Wood et al. |
| 6,720,279 | B2 | 4/2004 | Cree et al. |
| 6,722,106 | B2 | 4/2004 | Bartel et al. |
| 6,764,566 | B1 | 7/2004 | Griesbach, III et al. |
| 6,765,125 | B2 | 7/2004 | Abuto |
| 6,774,188 | B1 * | 8/2004 | Robert et al. ............... 525/207 |
| 6,806,313 | B2 | 10/2004 | Couturier |
| 6,832,418 | B2 | 12/2004 | Hartgrove et al. |
| 6,846,532 | B1 | 1/2005 | Bensur |
| 6,851,462 | B2 | 2/2005 | Frank et al. |
| 6,894,085 | B2 | 5/2005 | Beaverson et al. |
| 6,911,572 | B1 * | 6/2005 | Bruhn et al. ............... 604/358 |
| 6,953,510 | B1 | 10/2005 | Mackay et al. |
| 6,972,010 | B2 | 12/2005 | Pesce et al. |
| 6,974,890 | B1 | 12/2005 | Porsö et al. |
| 6,994,698 | B2 | 2/2006 | Leak et al. |
| 7,001,661 | B2 | 2/2006 | Beaverson et al. |
| 7,008,207 | B2 | 3/2006 | Bansal et al. |
| 7,019,073 | B2 | 3/2006 | Etherton et al. |
| 7,032,362 | B2 | 4/2006 | Dierl et al. |
| 7,056,310 | B2 | 6/2006 | Tanaka et al. |
| 7,138,452 | B2 | 11/2006 | Kim et al. |
| 7,166,671 | B2 | 1/2007 | Wood et al. |
| 7,183,359 | B2 | 2/2007 | Hanna et al. |
| 7,365,123 | B2 | 4/2008 | Wood et al. |
| 7,385,004 | B2 | 6/2008 | Wood |
| 2003/0113525 | A1 | 6/2003 | Beaverson et al. |
| 2003/0207056 | A1 | 11/2003 | Wood et al. |
| 2004/0037983 | A1 | 2/2004 | Reighard et al. |
| 2004/0110901 | A1 * | 6/2004 | Wood et al. .................. 525/69 |
| 2005/0043482 | A1 | 2/2005 | Etherton et al. |
| 2005/0053784 | A1 | 3/2005 | Wood et al. |
| 2005/0131119 | A1 | 6/2005 | Wood |
| 2005/0261426 | A1 | 11/2005 | Wood et al. |
| 2006/0182917 | A1 | 8/2006 | Wood et al. |
| 2006/0183856 | A1 | 8/2006 | Wood et al. |
| 2006/0205873 | A1 | 9/2006 | Wood et al. |
| 2007/0264520 | A1 | 11/2007 | Wood et al. |
| 2008/0032110 | A1 | 2/2008 | Wood et al. |

FOREIGN PATENT DOCUMENTS

| | | | |
|---|---|---|---|
| DE | 198 25 486 | A1 | 2/2000 |
| EP | 0 483 380 | A1 | 5/1992 |
| EP | 1 114 583 | A2 | 7/2001 |
| EP | 1 559 746 | A1 | 8/2005 |
| JP | 3-100065 | | 4/1991 |
| JP | 08100027 | | 4/1996 |
| WO | WO 00/66187 | | 11/2000 |
| WO | WO 01/02489 | A1 | 1/2001 |
| WO | WO-2005019337 | | 3/2005 |

OTHER PUBLICATIONS

Ahmed, E. et al., "Flavor and Odor Thresholds in Water of Selected Orange Juice Components," *J. Agric. Food Chem.*, vol. 25, No. 1, pp. 187-191 (1978).

Cancio, L. et al., "The Evolution of Microporous Film," *Nonwovens World*, vol. 13, No. 5, pp. 65-70 (Oct.-Nov. 2004).

De Roover, B. et al., "Molecular Characterization of Maleic Anhydride-Functionalized Polypropylene," *Journal of Polymer Science: Part A: Polymer Chemistry*, vol. 33, pp. 829-842 (1995).

Maltby, A. et al., "Fatty acid amides as torque release additives for beverage container closures," *CAD RETEC 2002 Conference sponsored by the Society of Plastics Engineers, Inc.*, Toronto, Canada, 12 pages (Sep. 30-Oct. 2, 2002).

Nachtigall, S. et al., "A Factorial Design Applied to Polypropylene Functionalization with Maleic Anhydride," *Polymer Engineering and Science*, vol. 39, No. 4, pp. 630-637 (Apr. 1999).

Ramirez, M. et al., "AFM Characterization of Surface Segregated Erucamide and Behenamide in Linear Low Denisty Polyethylene Film," *Nano Letters*, vol. 2, No. 1, pp. 9-12 (2002).

Rawls, A. et al., "Evaluation of Surface Concentration of Erucamide in LLDPE Films," *Journal of Vinyl & Additive Technology*, vol. 8, No. 2, pp. 130-138 (Jun. 2002).

Sankhe, S. et al., "Characterization of Erucamide Profiles in Multilayer Linear Low-Density Polyethylene and Propylene- Ethylene Copolymer Films Using Synchrotron-Based FT-IR Microspectroscopy," *Applied Spectroscopy*, vol. 56, No. 2, pp. 205-211 (2002).

Schmidt, O., "Spunbond Manufacture Process Optimisation by Melt Filtration," *Gneuss Kunststofftechnik GmbH*, pp. 1-14 (Apr. 2005).

Zhang, R. et al., "Effect of the Initial Maleic Anhydride Content on the Grafting of Maleic Anhydride onto Isotactic Polypropylene," *J. Polym. Sci. Part A: Polym. Chem.*, vol. 43, pp. 5529-5534 (2005).

Zweifel, H. ,"Lubricants," *Plastics Additives Handbook*, 5th Edition, pp. 514-543 (2001).

Chung, T., "Functionalization by Post-polymerization Processes," *Functionalization of Polyolefins*, Chapter 5, pp. 65-78 (Copyright 2002).

European Search Report mailed Jul. 28, 2008.

"Plexar® PX5125 Extrudable Tie Layer Resin Anhydride Modified LLDPE," *Lyondell Chemical Company*, 1 page (Dec. 31, 1994).

Berejka, , "Electron Beam Grafting of Polymers", Ionicorp, Huntington, New York, *Advances in radiation chemistry of polymers*, IAEA, pp. 85-89 (Nov. 2004).

Rosiak, , "Radiation Polymerization in Solution", Institute of Applied Radiation Chemistry, Technical University of Lodz, Lodz, Poland, *Advances in radiation chemistry of polymers*, IAEA, pp. 41-60 (Nov. 2004).

European Search Report dated Jan. 29, 2010 from the European Patent Office in EP Patent Application No. 09173916.9, which corresponds to U.S. Appl. No. 10/672,297, filed Sep. 25, 2003, which is a parent application to the present U.S. Appl. No. 11/403,480 (3 pages).

* cited by examiner

DIMENSIONS OF CYCLODEXTRINS

Micrograph of NA 205 compounded with 3.30% beta cyclodextrin.

FIG. 5

Micrograph of PX 175 compounded with 2.78% alpha cyclodextrin.

Micrograph of PX 175 compounded with 3.30% beta cyclodextrin.

GRAFTED CYCLODEXTRIN

CROSS-REFERENCE TO RELATED APPLICATIONS

This application is a divisonal of application Ser. No. 10/672,297, filed Sep. 25, 2003, now U.S. Pat. No. 7,166,671, issued on Jan. 23, 2007, which claims priority under 35 U.S.C. §119(e) to provisional application Ser. No. 60/432, 523, filed Dec. 10, 2002, which applications are incorporated herein by reference.

FIELD OF THE INVENTION

The invention relates to polymer materials containing cyclodextrin used in a variety of end uses. The invention relates to polymer material, film, thick polymer webs, rigid or semi rigid sheets, chips barrier coatings and other forms of useful polymer. The invention also relates to packaging materials, closures, containers,

BACKGROUND OF THE INVENTION

The development of high-performance polymer-based packaging materials and structures has allowed the evolution of light-weight, flexible films and rigid containers, bottles and trays that protect the contents against the ingress or egress organic vapors, aromas, moisture, oxygen and other gasses. The goal is to make the underlying technologies transparent while minimizing the financial and environmental costs of these products to the final consumer. There is still a considerable need for polymer materials and packaging systems that provide longer shelf-life stability under a wide range of storage conditions and food products. The present invention relates to barrier structures for food packages that are useful in providing extended product shelf life.

The outright size of the packaging industry makes it an attractive market with incredible numbers of technical challenges, e.g., flavor losses by scalping, tainting by off-odors and flavors, oxygen ingress, odor control, photodegradation (loss of value due to light sensitivity), loss of moisture, source reduction/waste recycling and environmental/social considerations. As fundamental polymer science innovations increase, the applications for new packaging expand considerably as well as the complexity of the solutions, thereby providing an ever-growing market for innovations. Current estimates suggest that the dollar value of the polymers used to manufacture packaging alone will account for more than $19 billion in 2002. The exploitation of olefin polymers as a packaging material has provided substantial advantages to producers, retailers and consumers over traditional glass, aluminum and metal materials since their introduction in the 1950's. The driving force for innovation has been to develop convenient and transportable packaging consumer's demand, while continuing to improve the functional properties for protecting freshness, quality and safety at an affordable price by using more innovative technologies, complex materials and structures.

Globalization of the food industry and their packaging suppliers is presenting challenges from a regulatory standpoint as materials to be exported must meet the requirements of whatever country to which the product is to be shipped. For the packaging innovator introducing novel packaging technologies, this represents a massive, protracted and costly undertaking. The regulatory agencies require that the materials, which are being manufactured, meet stringent safety standards for both human exposure and the environment.

Packaging materials have been the target of environmental and consumer activist groups as being a major contributor to the solid waste stream; these materials make up over one-third of the total waste generated in the United States. In many cases, manufacturers want to achieve source reduction and cost reduction by combining polyolefin layers of different barrier materials (e.g., nylon, polyvinylidene chloride—PVDC, ethylene vinyl alcohol—EVOH, etc.) to achieve the desired barrier properties and gauge; metallization of packaging films is yet another technique. In some cases, these approaches create incompatibility problems for pre-consumer in-plant scrape recycle and for post-consumer plastic recycle streams. Environmental considerations clearly influence current packaging technologies and will certainly continue to do so in the future.

In today's competitive markets, all technology innovations are driven by intense competition and therefore must meet the costs constraints and targets of the industry. The principal cost drivers in today's packaging are the raw materials. The value new, innovative technology brings to the package must be weighed against the added cost.

The invention provides a polyolefin having a grafted cyclodextrin to diminish regulatory concerns because the cyclodextrin is covalently bonded to the polymer eliminating food safety concerns related to cyclodextrin migration. The present invention provides an innovative functional material with significant property improvements that is compatible with source reduction, in-plant scrape recycle and post-consumer recycling.

The invention forms compatible cyclodextrin (CD)/functionalized polyolefin composition by grafting a parent, unmodified cyclodextrin onto a polyolefin using extrusion processing to reduce both material, manufacturing and regulatory costs and to lessen the impact on the environment which otherwise takes the synthetic route to synthesize a compatible cyclodextrin derivative.

The invention also provides a commercial polyolefin material having greater crystallinity and lower surface energy to effectively change the partitioning of compounds in direct contact with the polymer especially nonpolar compounds (e.g., alkanes, aromatic, terpenes and sesquiterpenes).

BRIEF DESCRIPTION OF THE INVENTION

The invention relates to novel functional polyolefin compositions and structures that contain cyclodextrin moieties pendant on the polymer. More particularly, this invention relates to a polyolefin comprising a reaction product of a functionalized polyolefin and cyclodextrin in which the cyclodextrin is grafted onto the functionalized polyolefin. Traditional mixing apparatus can be used for the conversion. By grafted, a functional group such as hydroxyl functionality of the cyclodextrin reacts with a reactive functional group on the polymer to form a bond between the cyclodextrin and the polymer. In a preferred mode, an anhydride or epoxide component of the functionalized polyolefin can be used to form a reaction product. For example, a primary hydroxyl on the cyclodextrin reacts with a maleic anhydride moiety under conditions that convert substantially all anhydride groups to a half-ester. It has quite unexpectedly been found that by such conversion it is possible to significantly change low molecular weight transport of organic compounds in conventional polyolefin polymers using parent cyclodextrins. This invention is also a process for producing the reaction product of the functionalized polyolefin and the cyclodextrin by melt grafting with functionalized polyolefin in a customary compounding apparatus forming a compatible cyclodextrin/polyolefin composition.

Cyclodextrin grafted polymer compositions, according to the present invention, are useful in extruded or molded structures such as thin films, laminates, semi-rigid films and rigid containers as well as fibers. For instance, these structures provide functional properties for a sealant layer in flexible food packaging, a beverage contact layer for cartons and bottles, plastic closures and sealing element layers for bottle and jars for sauces, soups, puddings, baby food and wine, a non-contact layer in plastic fuel tanks, and polymers used to manufacture fiber, textile, and nonwoven compositions for disposable diapers.

DETAILED DESCRIPTION OF THE INVENTION

Briefly, the invention comprises a polyolefin covalently bonded to a CD. The CD can be reacted with a functionalized polyolefin. Polyolefins with a variety of reactive functional groups can be used to covalently bind CD. One version is modification or functionalization of polyolefins where a peroxide initiator is used with various unsaturated polar monomers to add chemically reactive moieties on the polymer has important unexpected application when used in combination with a group of compounds in this present invention known as cyclodextrins.

Cyclodextrin (CD) is a cyclic oligomer of α-D-glucose formed by the action of certain enzymes such as cyclodextrin glycotransferase (CGTase). Three cyclodextrins (alpha, beta, and gamma) are commercially available consisting of six, seven and eight α-1,4-linked glucose monomers, respectively. The most stable three-dimensional molecular configuration for these oligosaccharides is a toroid with the smaller and larger opening of the toroid presenting primary and secondary hydroxyl groups. The specific coupling of the glucose monomers gives the CD a rigid, truncated conical molecular structure with a hollow interior of a specific volume.

Commercial polyolefin functionalization is achieved using solution, melt and solid state routes known in the art. The process covalently bonds monomers onto vinyl polymers or onto polyolefin polymers including copolymers of olefins with other monomers, such as vinyl monomers, which predominately constituent the olefin portion. Polyolefins useful in this invention include poly(ethylene) or PE, poly(propylene) or PP, poly(ethylene-co-propylene) or PEP, ethylene/methyl acrylate copolymer, and ethylene/ethyl acrylate copolymer. The polyolefins can be functionally modified with unsaturated compounds such as unsaturated anhydrides and carboxylic acids. Additionally, there are terpolymers of ethylene-acrylate(ethyl or butyl)-maleic anhydride and ethylene-methyl acrylate-glycidyl methacrylate. Any packaging grade of a vinyl polymer can be used.

Functionalized polyolefins have extensive industrial applications such as coextrusion tie resins in multi-layer films and bottles for the food industry, compatibilizers for engineering polymers and plastic fuel tank tie resins for the automotive industry, flexibilization and compatibilization of halogen free polymers for cables and for filler materials used in roofing construction. Functionalized polyolefins useful in the present invention are maleated polyethylene and polypropylene (Orevac™ and Lotryl™ from ATOFINA, Plexar® resins from EQUISTAR, Fusabond® resins from DuPont, OPTM resins from MÂNAS, and EXXELORTM from Exxon/Mobil), functionalized EP, EVA and EPDM (such as ethylene-propylene-butadiaene or, ethylene-propylene-1,4-hexadiene polymers)ethylene-octene copolymers, ethylene-n butyl acrylate-maleic anhydride, ethylene-ethylacrylate-maleic anhydride terpolymers and copolymers of ethylene-glycidyl methacrylate and the like. The ethylene-propylene-1,4-hexadiene polymer can be represented as:

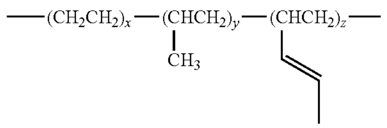

wherein x,y and z are selected to obtain about 70 to 90 wt % ethylene, about 10 to 30 wt % propylene and up to about 5 wt % 1,4-hexadiene. The vacant bonds are linked to similar groups, H, or end groups.

The olefinic compositions of the invention with pendent CD moieties can be extruded, laminated or molded into a variety of useful films, sheets, closure liners and caps, structures or shapes using conventional processing technology.

Compositions of this invention may be prepared using reactive extrusion by feeding a dry cyclodextrin, or derivative thereof, (<0.10% moisture), a functionalized polyolefin and optionally a second polyolefin, into an extruder at temperatures such that the cyclodextrin reacts with the functionalized polyolefin as the molten polymer and cyclodextrin are transported through the extruder to form a reaction product containing, for example, an ester group which covalently bonds the cyclodextrin to the polyolefin. The ratio of functionalized polyolefin to non-functionalized polyolefin can be adjusted for a specific application and conversion process. The present invention is directed to a stoichiometric reaction product of a cyclodextrin and a graft linking agent (i.e., anhydride, epoxide, etc.), resulting in a modified polymer especially suited as a masterbatch which can be subsequently let down with one or more non-functionalized thermoplastic polymers and thermoplastic elastomers at a weight ratio of one (1) parts of the masterbatch composition to ten (10) to twenty (20) parts of non-functionalized polymer. In other words the blend of polymer and master batch, or functionalized polymer, after blending can contain about 0.01 to 10 wt % of the CD functionalized polymer, in certain applications the polymer can contain about 0.1 to 8 wt % of the functionalized material or about 0.5 to 5 wt % of the functionalized material. The stoichiometric ratio for melt grafting is calculated on a gram-mole (gram-formula-weight) basis where one (1) gram-mole of CD (α, β or γ) is equivalent to one (1) gram-mole the grafted anhydride, glycidyl and carboxylic acid moiety.

Fumaric acid can be used as the grafting agent by rearranging and dehydrating fumaric acid as shown:

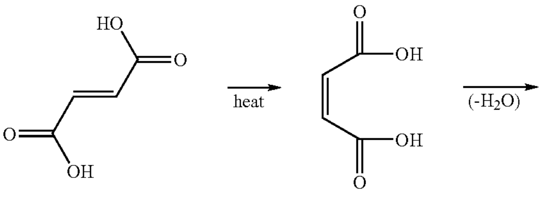

-continued

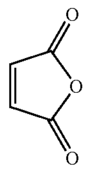

Maleic anhydride can be grafted onto the olefinic polymer using an "ene" reaction in which the olefinic character of the polymer reacts with maleic anhydride to add the anhydride to the polymer chain, the reaction is exemplified, in the model structure, as follows:

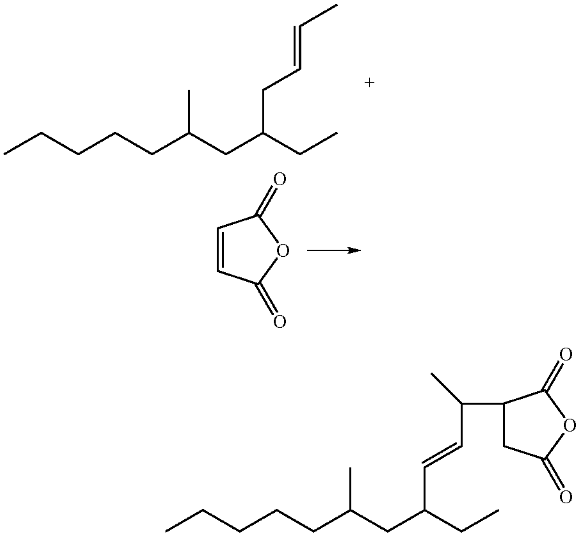

Maleic anhydride can be grafted onto the olefinic polymer using a free radical reaction by cleaving the polyolefin forming a free radical that can combine with maleic anhydride to form the grafted anhydride, the free radical mechanism is exemplified as follows:

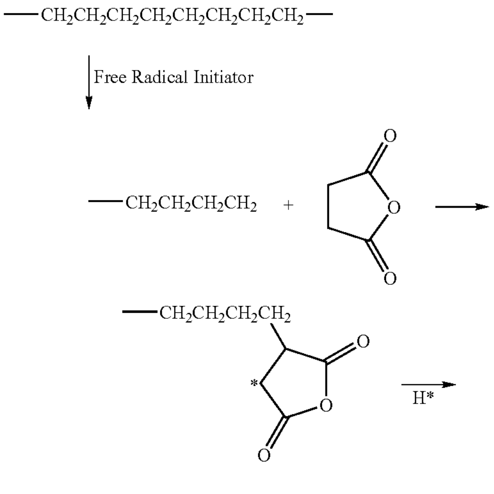

-continued

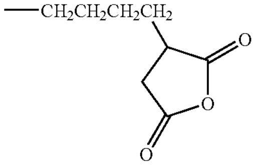

resulting in a grafted material. The reaction can occur at either a backbone unsaturated carbon or at an unsaturated carbon in a group pendent to the polymer backbone. The backbone can comprise randomly substituted covalently bonded groups comprising a cyclodextrin compound.

The inventive composition can be processed by any of the conventional blending or compounding processes known for blending particulate into polymer in the thermoplastic processing arts. The CD grafting process of the subject invention is carried out in any conventional batch mixer, twin screw or single screw extruder capable of melting and homogeneously mixing the components of the process to produce a covalent bonded CD. The grafting reaction is conveniently carried out in the extruder or mixer of the invention. The preferred twin-screw compounder is configured with multiple barrel segments for inline additive compounding and optional devolatilization. A feeder, preferably a gravimetric feeder, is used to feed the functionalized polyolefin into the first barrel zone of the extruder. A second additive feeder, either gravimetric or volumetric, is used to feed dry cyclodextrin upstream of the dispersive barrel segment. Care must be taken during the compounding process to prevent atmospheric moisture sorption by the CD. The twin-screw compounder is setup with two kneading sections. The kneading sections are spaced along the screw so the first kneading section melts the resin and mixes it, and the second kneading section allows dispersive mixing with minimal shear of resin. The conveying section in the first zone has increasing element pitch followed by dispersive screw elements. Following the dispersive section, a short section is used to convey the melt without increasing temperature and again followed by distributive mixing elements before the composition exits the compounder. Alternatively, the cyclodextrin can be metered into the first barrel zone along with the functionalized resin pellets from the gravimetric feeder. In this case, the barrel segments may be reduced and the dispersive mixing barrel elements moved up. The resin may be devolatilized in either configuration by drawing a vacuum in a downstream barrel segment before the resin is pumped out through a strand die. The molten polymer strands are run into a water bath and two air wipes before entering the strand cutter. The goal of the compounding step is to minimize moisture introduction while ensuring a consistent feed of the cyclodextrin with good dispersion in the functionalized resin.

In the present invention, in preparing a functionalized polyolefin/CD master batch, using a cyclodextrin material having reduced or low moisture content is important. When a masterbatch composition is produced, it can pick up some water in the water bath and may require drying in a hot air fluidized bed, an air oven or a vacuum oven prior to use in a conversion process. The downstream process, as well as the application, dictates the residual moisture content of the masterbatch. After the masterbatch is compounded, the CD moisture content can be varied to accomplish various aspects of the invention. Surprisingly, the barrier properties of a material made of a functionalized polyolefin/CD masterbatch letdown into virgin matrix material are not maximized if dry cyclodextrin material is used. The absence of cyclodextrin moisture leads to greater complexation of residual impurities inherent in all thermoplastic resins. The presence of some moisture in the cyclodextrin reduces complexation during the compounding and conversion processing steps. Cyclodextrin moisture levels between 0.5% and 2% in the masterbatch will generally minimize or substantially prevent residual resin impurity complexation. Further, these levels of cyclodextrin moisture do not adversely affect polymer morphology or cause other adverse barrier affect such as matrix pinholes, microscopic voids, etc. The presence of some moisture in the cyclodextrin does not impede or reduce inclusion complex formation with diffusing permeants.

Chemically grafting CD molecules onto functionalized polyolefin polymers economically produces a barrier or selective barrier structure with tailorable properties based upon the CD pore size (α, β, γ), whether the CD is unmodified or modified, and the concentration of the grafted CD in the finished polymer. These unique properties include reducing the transport of low molecular weight impurities inherent in polymers, improving the intrinsic organic vapor barrier properties of the polymer, changing the surface energy of the polymer and thereby change polar and nonpolar organic partitioning at the interface, and increasing polymer crystallinity an important polymer characteristic especially in olefinic polymers. These property improvements significantly add value to commercial commodity resins. These enhancements come with additional benefits not achievable with compatible cyclodextrin derivatives—pendent moieties or substituents that render the CD material compatible with the thermoplastic polymer—known in the art (U.S. Pat. Nos. 5,492,947, 5,603,974, 5,837,339 and 5,928,745) which also achieve reduced migrants and barrier properties. The present novel CD grafted polymers have additional benefits that include significant changes in the polymer's surface energy, increased polymer crystallinity, significantly lower implementation costs, fewer regulatory safety concerns and, in some cases, a "greener" more environmentally/socially responsible barrier polymer.

For this invention, a compatible CD means the CD material contains at least one pendent group capable of reacting with either an anhydride or epoxide functionalized polyolefin. Additionally, the CD material can be uniformly dispersed into the melted functionalized polyolefin, can reside in the polymer without reductions in the intrinsic barrier properties of the polyolefin, and can retain the ability to trap or complex diffusing permeants or polymer migrant impurities, and can change the surface energy of the polymer, organic molecule partitioning and improve polymer crystallinity.

We have found that polyolefin incompatible CD, like unmodified α, β and β-CD can be dispersed into functionalized polyolefins, covalently bonded to the functionalized polyolefin forming a compatible composition without microscopic particles or decomposition of the unmodified CD during compounding or during subsequent conversion steps. Further, we have found that functionalized polyolefins with covalently bonded unmodified CD do not cause melt fracture by visual inspection of the extrudate. Lastly, cross-sectioned polyolefin extrudate examined by optical microscopy is shown to be free of CD agglomerates.

Cyclodextrin

Cyclodextrin is a cyclic oligosaccharide consisting of at least six glucopyranose units joined by α(1→4) linkages. Although cyclodextrin with up to twelve glucose residues are known, the three most common homologs (α cyclodextrin, β cyclodextrin and γ cyclodextrin) having 6, 7 and 8 residues have been used.

Cyclodextrin is produced by a highly selective enzymatic synthesis. They consist of six, seven, or eight glucose monomers arranged in a donut-shaped ring, which are denoted α, β, or γ cyclodextrin respectively (See FIGS. 1A, 1B and 1C, respectively). The specific coupling of the glucose monomers gives the cyclodextrin a rigid, truncated conical molecular structure with a hollow interior of a specific volume. This internal cavity, which is lipophilic (i.e.,) is attractive to hydrocarbon materials when compared to the exterior, is a key structural feature of the cyclodextrin, providing the ability to complex molecules (e.g., aromatics, alcohols, halides and hydrogen halides, carboxylic acids and their esters, etc.). The complexed molecule must satisfy the size criterion of fitting at least partially into the cyclodextrin internal cavity, resulting in an inclusion complex.

CYCLODEXTRIN TYPICAL PROPERTIES

| CD PROPERTIES | α-CD | β-CD | γ-CD |
|---|---|---|---|
| Degree of polymerization (n=) | 6 | 7 | 8 |
| Molecular Size (A°) | | | |
| inside diameter | 5.7 | 7.8 | 9.5 |
| outside diameter | 13.7 | 15.3 | 16.9 |
| height | 7.0 | 7.0 | 7.0 |
| Specific Rotation $[\alpha]^{25}_D$ | +150.5 | +162.5 | +177.4 |
| Color of iodine complex | Blue | Yellow | Yellowish Brown |
| Solubility in Distilled water (g/100 mL) 25° C. | 14.50 | 1.85 | 23.20 |

The oligosaccharide ring forms a torus, as a truncated cone, with primary hydroxyl groups of each glucose residue lying on a narrow end of the torus. The secondary glucopyranose hydroxyl groups are located on the wide end. The parent cyclodextrin molecule, and useful derivatives, can be represented by the following formula (the ring carbons show conventional numbering) in which the vacant bonds represent the balance of the cyclic molecule:

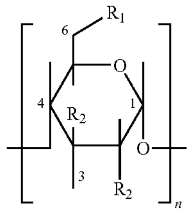

wherein $R_1$ and $R_2$ are primary or secondary hydroxyl as shown.

The CD's internal cavity size (i.e., α, β, γ) must be considered and the functional group modification must be suitable for changing the desired bulk polymer and surface polymer characteristics in addition to forming an inclusion complex with targeted volatiles or impurities. To achieve a specific result, more than one cavity size and functional group may be necessary.

According to the present invention, the cyclodextrin is a compound substantially free of an inclusion complex. For this invention, the term "substantially free of an inclusion complex" means that the quantity of the dispersed CD material in the bulk polymer contains a large fraction having CD free of a polymer contaminant in the central pore of the cyclodextrin ring (see FIG. 1A). The central pore is used as a binding location for permeants. Once used the central pore can acquire a permeant or other inclusion compound but some complexing can occur during manufacture. Such complexing can occur as residual polymer impurities and degradation materials become the inclusion compound in the CD inclusion complex.

CD molecules have available for reaction with a functionalized polyolefin the primary hydroxyl at the six position of the glucose moiety, and at the secondary hydroxyl in the two and three positions. Because of the geometry of the CD molecule, and the chemistry of the ring substituents, all hydroxyl groups are not equal in reactivity. However, with care and effective reaction conditions, dry CD molecule can be reacted to obtain grafted CD. CD with selected substituents (i.e.) substituted only on the primary hydroxyl or selectively substituted only at one or both the secondary hydroxyl groups can also be grafted if desired. Directed synthesis of a derivatized molecule with two different substituents or three different substituents is also possible. These substituents can be placed at random or directed to a specific hydroxyl. Further, CD alcohol derivatives (e.g., hydroxyethyl and hydroxypropyl) and amino derivatives can be reacted to make a grafted CD.

The preferred preparatory scheme for producing a grafted CD polyolefin material having compatibility with polyolefin resin involves reactions at the primary or secondary hydroxyls of the CD molecule. It is meant that a hydroxyl functionality of the CD reacts with the anhydride or expoxide component of the functionalized polyolefin to form a reaction product. The formation of an ester or ether bond on either the primary or secondary ring hydroxyls of the CD molecule involve well-known reactions. Further, CD having less than all of available hydroxyls substituted with derivative groups can be grafted with one or more of the balance of the available hydroxyls. The primary —OH groups of the cyclodextrin molecules are more readily reacted than the secondary groups. However, the molecule can be substituted on virtually any position to form useful compositions. Broadly, we have found that a wide range of pendant substituent moieties can be used on the molecule. These derivatized cyclodextrin molecules can include alkylated cyclodextrin, hydrocarbylamino cyclodextrin, and others. The substituent moiety must include a region that provides compatibility to the derivatized material.

Amino and other azido derivatives of cyclodextrin having pendent thermoplastic polymer containing moieties can be used in the sheet, film or container of the invention. The sulfonyl derivatized cyclodextrin molecule can be used to generate the amino derivative from the sulfonyl group substituted cyclodextrin molecule via nuclophilic displacement of the sulfonate group by an azide ($N_3^{-1}$) ion. The azido derivatives are subsequently converted into substituted amino compounds by reduction. Such derivatives can be manufactured in symmetrical substituted amine groups (those derivatives with two or more amino or azido groups symmetrically disposed on the cyclodextrin skeleton or as a symmetrically substituted amine or azide derivatized cyclodextrin molecule. Due to the nucleophilic displacement reaction that produces the nitrogen containing groups, the primary hydroxyl group at the 6-carbon atom is the most likely site for introduction of a nitrogen-containing group. Examples of nitrogen containing groups that can be useful in the invention include acetylamino groups (—NHAc), alkylamino including methylamino, ethylamino, butylamino, isobutylamino, isopropylamino, hexylamino, and other alkylamino substituents. The amino or alkylamino substituents can further be reactive with other compounds that react with the nitrogen atom to further derivatize the amine group. Other possible nitrogen containing substituents include dialkylamino such as dimethylamino, diethylamino, piperidino and piperizino.

The cyclodextrin molecule can be substituted with heterocyclic nuclei including pendent imidazole groups, histidine, imidazole groups, pyridino and substituted pyridino groups.

Cyclodextrin derivatives can be modified with sulfur containing functional groups to introduce compatibilizing substituents onto the cyclodextrin. Sulfur containing groups manufactured based on sulfhydryl chemistry can be used to derivatize cyclodextrin. Such sulfur containing groups include hydroxyethylthio (—S—$CH_2CH_2OH$), imidazolylmethylthio, aminoalklylthio and others.

Applications and Uses

Long-established food packaging concepts are limited in their ability to extend the shelf-life of food products. Innovative food packaging concepts of the present invention interact with the environment inside the package and respond by changing their properties to maintain, adjust or improve the specific package headspace atmosphere or minimize food flavor loss to the package by "scalping" (i.e., uptake of volatile components by the polymeric package material from the food) thereby adding to product quality and extending shelf-life. The most notable group of technologies in use today for controlling package headspace oxygen is oxygen scavengers.

Multi-layer or composite packages, including gable top cartons, rely on essential layers of plastic that adds strength, barrier to other materials in the structure, and sealability. By way of example, gable-top milk and juice cartons are specifically disclosed in U.S. Pat. Nos. 5,816,487, 5,508,075, 5,616,353, 6,193,827 and 6,372,317 as liquid tight containers. While these familiar gable-top cartons have been extensively used throughout the United States to contain juices, they are associated with some problems. Most interior polyolefin food contact or sealant layers scalp low molecular weight volatile organic aroma and flavor compounds from the food into the polymer, based on the sorption mechanism, has been and continues to be the subject of considerable attention and concern. Sorption may result in the loss of aroma and flavor volatiles associated with product quality. Anhydride-functionalized polymers modified with cyclodextrin effectively address problems related to poor organic barrier, surface hydrophobicity, and food flavor scalping over blends of conventional polyolefin. The invention described herein is particularly useful for containers constructed from laminates having a heat sealable internal food contact surface which enables significant flavor retention in fruit juices contained therein over the shelf life of the product.

In a properly designed food package, polymers should sorb a minimum amount of the critical flavorings while meeting all other performance requirements. Flavor loss due to sorption into the packaging polymer is generally assumed detrimental to product quality. In contrast, the fruit juice industry has designed liquid packaging to take advantage of sorption losses by striving to eliminate off-flavor precursors. The present invention relates to the use of the package food contact polymer layer, as illustrated by the juice example, to selectively remove undesirable off-flavors from the packaged foods while minimizing the loss of important flavoring compounds. The food package contact layer can be constructed of anhydride-functionalized polymers modified with cyclodextrin to effectively address problems related to poor organic aroma/flavor barrier, unwanted food flavor scalping, and removal of offensive odors/aromas from the interior of food packages produced by lipid oxidation, lipid hydrolysis and protein/amino acid breakdown of the packaged food. These active packaging polymer improvements are significant over conventional polyolefins and can considerably improve food taste over the shelf life of the product.

Packaging laminates have been used for many years for packaging food products. A widely known and used container is a paperboard-based structure, which is coated with various barrier and sealant materials. The contact layer for the food package of the present invention is heat sealable, thus providing a useful barrier structure for converting a stock material into cartons and similar food retaining packages which require heat sealing. The barrier structure of the present invention is particularly useful in packaging orange juice and similar citrus products. Anhydride-functionalized polymers modified with cyclodextrin lead to the improved interfacial interaction of conventional polyolefin polymers such as changing partition coefficients, polymer solubility coefficients due to hydrophobicity, greater crystallinity, and providing a selective scavenging function.

As the plastics industry has matured, it has developed numerous specialty foods packaging applications. A large number of single and multi-layer structures are available to store liquid or solid, food or non-food products. There continues to be a need for high performance, value-added packaging that is capable of maintaining or improving a specific internal package environment to assure improved quality, safety and shelf life while also achieving this objective from progressively thinner and transparent films. Current low oxygen-barrier packaging methods do not eliminate all the deteriorative chemical reactions produced by the stored foods or the packaging, so undesirable chemical by-products such as odor and taste taints continue to be produced in trace amounts, and these are effectively retained in the headspace of the package re-adsorbed by the product reducing product flavor quality and shelf life. When the ratio (proportion) or the total concentration of these compounds gets too far out of line, they contribute to food off-flavor.

Low and intermediate moisture level foods comprise a large part of the shelf stable foods such as cereals, crackers, cookies, salted snacks, etc. They contain fat, protein, starches and are subject to many deteriorative chemical reactions. The most important chemical changes are associated with hydrolytic reactions, enzymatic action, oxidative reactions, particularly lipid oxidation that alters the flavor of many lipid containing foods, and non-enzymatic browning. The chemical compounds produced from these reactions vary widely in their chemical and physical properties. They also vary in their impact on flavor. Some are responsible for pleasant aromas, while others produce offensive odors and flavors, often causing major problems in the storage of foods. So removing all of these compounds will cause flavor fade or removing some and not others will cause flavor imbalance—a bad tasting food.

In breakfast cereal, for example, accelerated shelf life studies using elevated temperature and low humidity produce a number of deteriorative chemical compounds. Cyclodextrins can minimize the headspace accumulation of volatile chemical family compounds (i.e., aromatic, alkanes, alkenes and ketones) in addition to aldehydes which cannot be removed by traditional antioxidants, and oxygen and aldehyde scavengers. Cyclodextrins can trap hydroperoxides and other compounds that are produced by oxidation of the sealant polymer during extrusion and are known to be detrimental to flavor quality. Further, grafted CD/polyolefin can selectively partition specific unwanted off-flavor compounds from the headspace surrounding the stored food into the sealant polymer layer without significantly affecting preferred desirable flavors and thereby preventing flavor fade. The CD pore is an effective trap for a broad spectrum of undesirable odors known to cause flavor defects in packaged foods.

A large proportion of fresh fruits, vegetables and cut flowers harvested are lost due to spoilage resulting from increased levels of ethylene gas in the package headspace. One of the ways to retard the ripening of fruits, vegetables and the quality of fresh flowers is to reduce the ethylene gas generated. The ethylene absorbing capacity of a LDPE film can be improved by having a thin contact inner layer with a functionalized LDPE and cyclodextrin. Cyclodextrin grafted polymers can be used as the food contact layer in a multilayer structure to extend product shelf life by reducing ethylene gas in the headspace surrounding the product and maintaining the appropriate humidity (generally greater than 80% RH) so undesirable wilting and shriveling doesn't take place. If the produce is sealed in an impermeable film, headspace $O_2$ levels will fall to low levels where annerobic respiration takes place forming undesirable odor and flavor compounds such as ethanol, acetaldehyde and organic acids. The advantage of grafting cyclodextrin onto the polyolefin is that a high concentration of CD can be used in the LDPE skin layer to improve the partitioning of ethylene gas and other organoleptic precursors from the headspace without degrading the intrinsic olefin barrier properties to moisture and gasses.

Beverage sealing elements and plastic screw cap closure shells generally contain one or more of the following thermoplastic materials: low density polyethylene and linear low density polyethylene (LDPE and LLDPE), high density polyethylene (HDPE), polypropylene (PP), ethylene vinyl acetate (EVA), polyvinylchloride (PVC) and polyvinylidene chloride (PVDC). High barrier liner materials are usually compounded compositions containing a thermoplastic (typically an olefin) and dispersed into the thermoplastic are elastomeric materials (typically a butyl rubber, a styrene butadiene rubber or a acrylic rubber) forming a thermoplastic elastomer material composition. These thermoplastic compositions are manufactured into shapes that allow them to function as a closure element for a standup pouch, jar or bottle of metal, glass or plastic. Screw cap plastic closure shells used to seal carbonated soft drinks, carbonated waters, etc. contain a two-component system comprising a PP screw cap shell and a monolayer liner usually produced from LDPE and EVA to provide a positive seal. Closure shells for non-carbonated beverages (e.g., still water) are manufactured from PP as a single piece functioning both as a screw cap and liner. Closure shells and liner compositions contain a number of additional performance additives—lubricants, antistats, plasticizers, heat stabilizers, antioxidants and pigments. One additive in particular, a common polymer lubricant called erucamide, improves the melt flow properties and reduces the adherence of the liner and shell to the bottle by decreasing release torque. Additives, which function at the surface of the polymer, are traditionally migratory and migration occurs over time. The surface of the polymeric shells and liners of the container can become sources of chemical precursors susceptible to ozonolysis from residual ozone.

Ozonation is commonly used worldwide for disinfecting drinking water stored in bottles. Residual ozone, typically ppb levels, remains in the water after bottling. Ozone reacts with unsaturated compounds forming unstable organic ozonides, which decompose rapidly into oxygen compounds, such as aldehydes, ketones, and peroxides, or react rapidly with oxidizing or reducing agents. The unsaturated chemical bonds in erucamide and oleamides, which migrates to the surface of the closure polymer and to a lesser extent unsaturated olefin monomers and oligomers exposed on the surface, producing an organoleptic defect often described as a "plastic" taste. The plastic off-taste can be associated with the presence of part per billion (ppb) levels of low human threshold organoleptic compounds, particularly $C_{1-30}$ aldehydes such as hexanal, heptanal, octanal, nonanal and decanal. Residual organoleptic volatiles, which are produced either from chemical oxidation by ozone or through thermo oxidation or photo oxidation of the liner or closure, can be effectively complexed by dispersing a functionalized polyolefin/CD composition within the liner or closure composition preventing their migration into the beverage. The present invention relates to container liner and shell compositions for retaining a foodstuff, beverage or pharmaceutical containing grafted cyclodextrin to reduce off-taste and odor organoleptic migrant and ingress permeants, thus improving taste of the stored product.

Fibers used in the present invention may be any polyolefin fibers known in the art. The thread-like fibers used in the invention are a composition comprising a functionalized polyolefin and grafted CD and polyolefin and are used to construct a nonwoven web comprised of one or more overlapping or interconnected fibers in a nonwoven manner. The fibers can be in the form of a long filament produced by spun melt or melt blown processes. Any nonwoven polyolefin fibers known in the art may be used in the present invention. The nonwoven webs may be used to construct bandages, disposable diapers and incontinent products, which have an improved odor control system to reduce or eliminate malodors caused by bodily fluids, such as blood, urine, menses, and the like. The functionalized polyolefin and grafted CD is homogeneously distributed throughout the fiber permitting malodor compounds to sorb into the fiber and then diffuse into the core of the fiber where they are complexed or effectively trapped by the CD throughout the entire fiber preventing their olfactory detection. The nonwoven web produced from functionalized polyolefin and grafted CD both changes the fibers wetting properties and effectively absorbs malodors and reduces olfactory detection.

Currently, the five-layer coextruded fuel tank is the de facto industry standard in North America. Coextruded tanks are designed to meet strict evaporative fuel standards and consist of an inner layer of HDPE joined by a tie layer and barrier layer of polyimide (nylon) or ethylene-vinyl alcohol (EVOH) copolymer. The tie layer is an adhesive resin formed by the copolymerization or graft polymerization of HDPE with maleic acid, and has a functional group which adheres to a polyethylene chain polymer. An additional tie layer is joined by a layer of "regrind" and an outer layer of HDPE. The use of the "regrind" layer adds an additional layer for a six-layer tank wall. The invention can be used to substantially improve the barrier properties in commercial thermoplastic fuel tanks by adding a functionalized HDPE grafted with CD to the outer HDPE layer composition of the fuel tank to reduce gasoline vapor permeation.

The present invention is directed to a process whereby improved anhydride-functionalized polymers, most notably, polyolefins grafted with maleic anhydride, are produced. For the improvement, the anhydride-functionalized polymer is modified by reacting with a CD under conditions that can convert all, when needed, or a portion of the anhydride groups to the corresponding half-ester. While it is known to graft diesters and half-esters of dicarboxylic acids or their anhydrides, such as maleic acid or maleic anhydride, onto various polymer substrates, polyolefin polymer compositions obtained by grafting CD onto a functionalized polyolefin exhibit a substantial increase in crystallinity and improve the interfacial interaction of conventional polyolefin polymers such as changing partition coefficients, surface energy due to hydrophobicity, improve polymer barrier, and providing a selective scavenging function. Cyclodextrin grafted polymers can be used in various structures and types of food packaging to extend product shelf life, in fiber to reduce malodors and as a barrier to organic permeants in variety of applications.

BRIEF DISCUSSION OF THE DRAWINGS

FIG. 1 is a graphical representation of the dimensions of a cyclodextrin molecule without derivatization. The central pore comprises the hydrophilic space, central pore or volume within the cyclodextrin molecule that can act as a site for absorbing a permeant or such contaminant. In the FIGURE, α, β, or γ-cyclodextrin is shown. Such cyclodextrins have hydroxyl groups formed on the perimeter of the molecule that are available for reaction with anhydride and epoxide groups on functionalized polyolefins.

EXPERIMENTAL SECTION

Figures 1A, 1B, 1C:
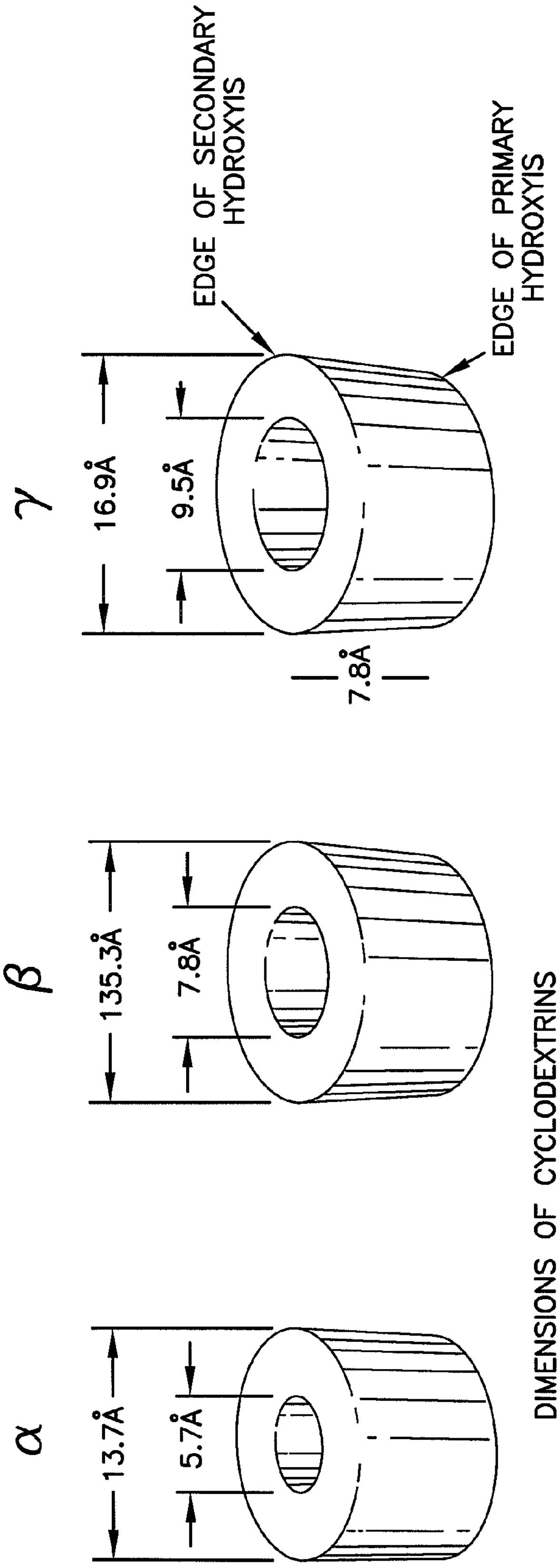

A further embodiment of the invention will show that chemically grafting cyclodextrin molecules onto functionalized polyolefin polymers produces a tailorable barrier with unique properties including reducing the mass transport of low molecular weight compounds, changing the surface energy of the polymer, effecting polar/nonpolar organic compound partitioning and increasing polymer crystallinity.

The foregoing discussion illustrates various compositions of this invention and application for a beverage contact layer for gabletop cartons and bottles, plastic closures and sealing elements and the sealant layers for flexible films. The following examples and data further exemplify the invention.

Compatibility Testing

Qualtitative Sample Preparation

Five polyolefin samples were compounded with and without unmodified α-CD and β-CD and visually checked for CD compatibility using an optical microscopy method. Two test coupons containing stoichiometric weight loadings α-CD and β-CD (2.78 wt % and 3.20 wt %) were compounded into an ethylene-maleic anhydride copolymer/LDPE blend (Plexar 175, Equistar Chemicals L.P.) using a Brabender Plasticorder Mixing Bowl. A Brabender mixing bowl consists of two counter rotating roller blades in a number eight-shaped bowl. Two additional test coupons containing the same weight loading of α-CD and β-CD used in the Plexar samples were compounded with LDPE (NA-204, Equistar Chemicals L.P.), the same LDPE used in the Plexar blend. And, finally, a fifth control sample of NA-204 LDPE resin was also compounded on a Brabender Plasticorder Mixing Bowl but without CD. All resins were dried at 85° C. for 2 hours under vacuum (<0.1" of Hg) before compounding, while α-CD and β-CD cyclodextrins were dried in a circulating air oven at 105° C. for 30 minutes.

Alpha Cyclodextrin Compounding in Low Density Polyethylene (LDPE) and Ethylene-Maleic Anhydride Copolymer/LDPE Blend (EMA/LDPE)

One and eleven hundredths gms of alpha cyclodextrin (lot 60P122, Wacker Chemie) was compounded into 39.89 gms of LDPE (NA204, lot ET626241, Equistar Chemicals, L.P.) or EMA/LDPE (Plexar PX 175, lot CL590803E1, Equistar Chemicals, L.P.) using a Brabender Plasticorder Mixing Bowl for 5 minutes at 130° C. and 80 rpm. The material was then molded into sample coupons 4.45 cm×1.59 cm×0.10 cm with an Atlas Laboratory Mixing Molder set at 140 rpm, 150° C. for 2 minutes, with a mold temperature of 90° C.

Beta Cyclodextrin Compounding in Low Density Polyethylene (LDPE) and Ethylene-Maleic Anhydride Copolymer/LDPE Blend (EMA/LDPE)

One and thirty one hundredths gms of beta cyclodextrin (lot 70P162, Wacker Chemie) was compounded into 39.69 gms of LDPE (NA204, lot ET626241, Equistar Chemicals, L.P.) or EMA/LDPE (Plexar PX175, lot CL590803E1, Equistar Chemicals, L.P.) using a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C.

Photographic Procedure

A stereomicroscope with camera (Polaroid Type 57 film), at ~10.6× magnification was used. Lighting was a halogen spot incident at approximately 45° to horizontal, of the surface of the plastic. A black piece of paper (Polaroid film sheath internal) was used as a backing, to control stray light. The photographs were scanned at 200 DPI, using the default brightness and contrast settings (i.e., no adjustment), and saved as JPEG's. Because the photographs were very flat in contrast, all the images were adjusted the same amount using GIMP: "−115" on brightness and "+65" on contrast. Dark artifacts in all photographs are from dust on the microscope optics.

The microscopic examination was used to visually check for compatibility between the polyethylene resin and cyclodextrin. The results show both alpha and beta cyclodextrin compounded into LDPE resin and molded into thin translucent coupons produce agglomerates and particles in the polymer matrix that are visible by microscopic examination. The microscopic results for alpha and beta cyclodextrin compounded on a stoichiometric weight basis into an anhydride functionalized LDPE resin and molded into thin translucent coupons produce no microscopic agglomerates or particles. The functionalized polyolefin/CD materials show the same clarity as the LDPE resin.

Polyolefin Crystallinity and Surface Energy Testing

Polyolefin Crystallinity

Degree of crystallinity affects the fundamental physical properties of the polymer. Crystallinity was measured by differential scanning calorimetry (DSC) by quantifying the heat associated with melting (fusion) of the polymer. Samples containing stoichiometric weight loadings β-CD were compounded in the Brabender Plasticorder Mixing Bow and were analyzed by DSC over a temperature range of −20° C. to 160° C. All of the samples were subjected to an initial thermal treatment from room temperature to 160° C. to impart equivalent thermal history to all samples. Following the thermal treatment, samples were then subjected to a controlled cooling program 160° C to −20° C. followed by a controlled heating program from −20° C. to 160° C. The second heats of melting, ΔHm, and the cold crystallization, ΔHc, are determined from by integrating the areas (J/g) under the peaks. The percent crystallinity was determined from the following equation:

$$\%\ \text{Crystallinity}=[\Delta Hm-\Delta Hc\ ]/\Delta Hm^{\circ}$$

[The Reference heat of melting (ΔHm°) for polyethylene is 293.6 J/g]

Two LDPE resins (NA 204 and NA 214, Equistar Chemicals, L.P.) and three maleic anhydride functionalized resins (Plexar resins PX 175, PX 5125, PX 1856 and PX 1857, Equistar Chemicals, L.P.) and the four Plexar resins compounded with a stoichiometric weight loading of β-CD (3.2 wt %, 3.2 wt %, 4.6 wt % and 2.3 wt %, respectively) were analyzed by DSC. All the samples were subjected to identical processing conditions (thermal history) to eliminate processing effects. The percent crystallinity results are provided in Table 1.

The results clearly show that β-CD grafted maleic anhydride functionalized LDPE has significantly greater crystallinity than compounded maleic anhydride functionalized LDPE without CD.

Surface Energy by Dynamic Contact Angle

Sorption and partition coefficients of various compounds are highly correlated to molecular structure. PE has a very high affinity for nonpolar flavor compounds, e.g. limonene, myrcene, pinene and valencene. Since beverages are water based, a situation is created where nonpolar flavor compounds, more miscible in PE, are preferentially absorbed from the beverage. We hypothesize that by changing the surface energy of the polymer by grafting CD onto a functionalized polyolefin the surface polarity increases, thereby lowering the equilibrium partition coefficient and increasing nonpolar flavor retention. To accomplish this, the contact food layer should selectively partition undesirable off-flavors from the packaged food while minimizing the loss of important flavoring compounds.

The surfaces of cyclodextrin-grafted polyolefins were measures using a variation of the Wilhelmy slide technique. In this test method, a liquid with a known surface tension is used to determine the contact angle of an uncharacterized material. The technique measures the force exerted on the material to be characterized, extrapolated to the moment of contact, the contact angle is using the following equation force (F), surface tension (γ), and the perimeter of contact (p) is:

$$F=\gamma p\cos(\theta)$$

Two LDPE resins (NA 204 and NA 214, Equistar Chemicals, L.P.) and three maleic anhydride functionalized resins (Plexar resins PX 175, PX 5125 and PX 1856, Equistar Chemicals, L.P.) The three Plexar resins compounded with a stoichiometric weight loadings α-CD and β-CD (2.78 wt % and 3.2 wt %) were analyzed for dynamic contact angle. All the samples were subjected to identical molding conditions to eliminate processing effects on surface conditions, i.e., contaminants and texture. The large area of the test sample coupons 4.45 cm×1.59 cm×0.10 cm is "averaged." Samples were tested in an Instron equipped with a 50 gmf load cell. The samples to be tested were lowered into a beaker of +18 Mohm water (polar liquid) and reagent grade toluene (nonpolar) and withdrawn. The liquid volume used was approximately 200 mL held at 24° C.± during the testing. The Instron cross-head travel was 2 mm/min. and the extent of travel was 12 mm. The data files where imported into EXCEL for data analysis and calculation of contact angle. Triplicate results are averaged results are provided in Table 1.

The results show a reduction in the contact angle of a CD grafted polyolefin compared to the same functionalized polyolefin without CD when tested in water. The decrease in the contact angle indicated a change in the surface energy of the CD grafted polyolefin making the material slightly more hydrophilic. Additionally, when the samples are tested in toluene, the surface tension of a CD grafted polyolefin compared to the same functionalized polyolefin without CD showed a decrease indicating a less hydrophobic surface.

TABLE 1

Physical test data summary of low density polyethylene (LDPE), ethylene-maleic anhydride copolymer/LDPE blend and β-CD grafted ethylene-maleic anhydride copolymer/LDPE blend.

| | Bulk Polymer Properties | | |
|---|---|---|---|
| Sample ID | Melt Peak #1 % Crystallinity | Melt Peak #2 % Crystallinity | Total % Crystallinity |
| NA 204 | 25.0% | 3.8% | 28.8% |
| PX 175 | 31.7% | 9.5% | 41.2% |
| PX 175 + 3.2% β-CD Grafted | 33.1% | 8.7% | 41.8% |
| PX 5125 | 21.4% | 21.9% | 43.2% |
| PX 5125 + 3.2% β-CD Grafted | 21.7% | 23.4% | 45.1% |
| NA 214 | 38.6% | ND | 38.6% |
| PX 1856 | 23.3% | 7.7% | 31.0% |
| PX 1856 + 4.6% β-CD Grafted | 29.2% | 10.6% | 39.8% |

| | Polymer Surface Properties | | |
|---|---|---|---|
| Sample ID | $H_2O$ Advancing Contact Angle | $H_2O$ Retreating Contact Angle | Surface Tension Dynes/cm (Toluene) |
| NA 204 | 104.1 | 75.7 | 31.90 |
| PX 175 | 101.1 | 75.3 | 31.25 |
| PX 175 + 3.2% β-CD Grafted | 95.7 | 63.5 | 30.88 |
| PX 5125 | 97.5 | 76.8 | 31.52 |
| PX 5125 + 3.2% β-CD Grafted | 98.3 | 71.1 | 32.93 |
| NA 214 | 101.8 | 71.0 | 31.83 |
| PX 1856 | 99.7 | 72.3 | 30.54 |
| PX 1856 + 4.6% β-CD Grafted | 93.6 | 62.9 | 31.12 |

Equilibrium Partition Coefficients

Example I

Selective flavor compound sorption by package contact materials continues to be a problem especially in beverages packaged in contact with LDPE. Nonpolar compounds have a very high affinity for LDPE. The partition coefficient of various aroma/flavor compounds into PE are highly correlated to their molecular structure and greatly influenced by polymer type, degree of crystallinity as well as the structure of the solute, and chain length and polarity of solute. A commercial single-strength "not-from-concentrate" orange juice was used to measure flavor compound partitioning in CD grafted LDPE and LDPE without CD grafting.

Materials

Two ethylene-maleic anhydride copolymer/LDPE blends (Plexar 5125 and Plexar 175, Equistar Chemicals, L.P.) were compounded with a stoichiometric weight loading of unmodified β-CD (3.20 wt %) using a Brabender Plasticorder Mixing Bowl. A third control sample of LDPE resin was also compounded on a Brabender Plasticorder Mixing Bowl but without CD. All resins were dried at 85° C. for 2 hours under vacuum (<0.1" of Hg) before use, while β-CD cyclodextrin was dried in a circulating air oven at 105° C. for 30 minutes.

Beta Grafted EMA/LDPE (Sample 1A)—Beta Cyclodextrin Compounding in Ethylene-Maleic Anhydride Copolymer/LDPE Blend One and thirty one hundredths gms of beta cyclodextrin (lot 70P162, Wacker Chemie) was compounded into 39.69 gms of EMA/LDPE (Plexar PX175, lot CL590803E1, Equistar Chemicals, L.P.) using a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C.

Beta Grafted EMA/LDPE (Sample 1B)—Beta Cyclodextrin Compounding in Low Density Polyethylene (LDPE) and Ethylene-Maleic Anhydride Copolymer/LDPE Blend (EMA/LDPE)

One and thirty one hundredths gms of beta cyclodextrin (lot 70P162, Wacker Chemie) was compounded into 31.75 gms of EMA/LDPE (Plexar 5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C.

The CD grafted LDPE and control LDPE coupons were placed into hermetically sealed 300-mL glass bottles with ground glass stopper containing single-strength "not from concentrate" commercial orange juice and molded test polymer coupons (4.45 cm×1.59 cm×0.10 cm). The bottles where filled and sealed with the stopper to eliminate any headspace and allowed to remain at room temperature in the dark for 8 days. The CD grafted coupons, along with test coupons made from a reference polymer for comparison, and the orange juice in contact with the coupons were then analyzed for orange juice flavor compounds at the end of the test period.

Analytical Method

Extraction of orange juice volatiles and volatiles sorbed into the polymer coupons was conducted by solid phase microextraction, using a 75 μm carboxen-PDMS fiber (Supelco). Aliquots (25 mL) of orange juice were placed into 40-mL glass vials with plastic screw caps and Teflon coated septa, warmed to 40° C. and gentle mixed. Samples were equilibrated for 5 minutes prior to the insertion of the fiber and were maintained at 40° C. throughout the 35 min sorption period. The fiber is removed from the headspace and injected into the high-resolution gas chromatograph equipped with a flame ionization detector. An HP 5890 GC equipped with a 30 m×0.25 mm id DB5 capillary column (J&W Scientific) was used. Operating conditions were: column held at 32° C. for 3 min and then increased at 6° C./min to 200 ° C., helium carrier gas linear velocity 29 cm/sec. Analysis was conducted in a splitless mode. The unknown flavor peak area is integrated to quantitate the concentration, and then the unknown flavor concentration is calculated from a four-point standard calibration covering the concentration range of the samples. Sample concentrations are reported in ppm (µg/g—weight/weight). The flavor concentration is calculated from the calibration curve slope or response factor (RF).

$$\text{Concentration of Compound in } ppm = (\text{Peak Area } X \ RF) \div \text{Sample Wt.}$$

$$\text{Concentration of Compound in } ppm = \frac{\text{Peak Area}}{\text{Calibration Curve Slope}} \div \text{Sample Wt.}$$

The partition coefficient ($K_e$) was calculated for the test flavor compounds and the orange juice-polymer contact coupon system. $K_e$ values were determined using the following equation:

$$K_e(\text{differential}) = [Cp]_{eq}/[Coj]_{eq}$$

where $[Cj]_{eq}$ is the concentration of the flavor compound in the juice at equilibrium and $[Cp]_{eq}$ is the concentration of the flavor compound in the polymer at equilibrium both in (µg/g) determined by analysis. The partition coefficients ($K_e$) are presented in Table 2. The smaller the $K_e$, the lower the affinity of the flavor compound for the polymer, while larger coefficients reflect more favorable partitioning into the polymer.

A large body of literature exists describing the important sensory flavor and aroma compounds in orange juice. Partition coefficients for thirteen key orange juice aroma/flavor compounds were determined. The orange juice flavor compounds were selected for their contribution to sensory quality. Compounds which contribute to orange juice aroma and off-aroma are also included. The following combinations are responsible for the highest sensory ratings: limonene/ethyl butyrate/neral/geranial; limonene/ethyl butyrate/neral/geranial/α-pinene. Compounds which contribute to off-aroma and scalping them from the orange juice would be beneficial: α-terpineol/hexanal/4-vinyl guaiacol. Less limonene sorption and greater α-terpineol sorption is also desirable. Limonene has a partition coefficient in the CD grafted LDPE resin that is 18% less than the control polymer, and neral and geranial have partition coefficients which are 35% and 23% less, respectively. Finally, 4-vinyl guaiacol, an undesirable pineapple off-flavor, had a partition coefficient that is 10% greater.

TABLE 2

Equilibrium partition coefficients for orange juice aroma and flavor compounds in CD grafted low density polyolefins and commercial contact layer LDPE following eight days storage in commercial orange juice.

| | Odor Threshold[1] ppb in Water | Flavor Threshold[1] ppb in Water |
|---|---|---|
| Alcohols Total | | |
| Linalool | 5.3 | 3.8 |
| α-Terpineol | 280 | 300 |
| 4-Vinyl guaiacol | NA | 75 |
| Aldehydes Total | | |
| Hexanal | 9.18 | 3.66 |
| Octanal | 1.41 | 0.52 |
| Decanal | 0.53 | 1.07 |
| Neral | 85 | 41.4 |
| Geranial | NA | 40.0 |
| Esters Total | | |
| Ethyl butyrate | 0.13 | 0.13 |
| Hydrocarbons Total | | |
| α-Pinene | 9.5 | 1014 |
| β-Myrcene | 36 | 42 |
| Limonene | 60 | 210 |

TABLE 2-continued

Equilibrium partition coefficients for orange juice aroma and flavor compounds in CD grafted low density polyolefins and commercial contact layer LDPE following eight days storage in commercial orange juice.

| | | |
|---|---|---|
| Valencene | NA | NA |

| | EQUILIBRIUM PARTITION COEFFICIENTS - $K_e$ Temp - 22° C. | | |
|---|---|---|---|
| | β Grafted EMA/LDPE - 1A $K_e$ | β Grafted EMA/LDPE - 1B $K_e$ | Control Resin $K_e$ |
| Alcohols Total | 862 | 744 | 882 |
| Linalool | 315 | 292 | 264 |
| α-Terpineol | 493 | 434 | 569 |
| 4-Vinyl guaiacol | 54 | 18 | 49 |
| Aldehydes Total | 3150 | 3249 | 3412 |
| Hexanal | 173 | 151 | 132 |
| Octanal | 477 | 456 | 487 |
| Decanal | 871 | 783 | 400 |
| Neral | 702 | 577 | 1123 |
| Geranial | 928 | 1282 | 1269 |
| Esters Total | 123 | 116 | 90 |
| Ethyl butyrate | 123 | 116 | 90 |
| Hydrocarbons Total | 1907 | 2206 | 2234 |
| α-Pinene | 730 | 867 | 815 |
| β-Myrcene | 651 | 746 | 763 |
| Limonene | 452 | 522 | 547 |
| Valencene | 74 | 72 | 109 |

[1]E. M. Ahmed, R. A. Dennison, R. H. Dougherty, P. E. Shaw, "Flavor and Odor Thresholds in Water of Selected Orange Juice Components, J. Agric. Food Chem., Vol. 25, No. 1, 1978

Testing of Sealing Materials for Organoleptic Migrants

Example II

Low level volatiles (e.g., monomers, refinery contaminants, etc.) remain as a residue of the polymerization process or later thermo-oxidation products (e.g., aldehydes and ketones) may be produced during the conversion process. Dispersed in the polymer matrix, these components are able to migrate into food products in contact with the package by a process generally controlled by Fickian diffusion. These components are typically volatile and mobile enough to be detected by the human nose and give rise to an organoleptic defect often described as a "plastic" taste that is generally considered undesirable by many consumers. Polyolefins are widely used for sealing elements in carbonated water, beer and soft drinks, as well as in numerous sealant layers for shelf stable packages such as cereals, crackers, cookies, salted snacks, etc. Aldehydes are produced in small quantities when sealing materials are compounded and later converted to liners and shells. The objective is to show that CD grafted polyolefins compounded into closure compositions complex residual oxidation products, like aldehydes, in the thermoplastic resin during the compounding and molding process preventing them from out-gassing or migrating from the composition.

Masterbatch Material

CD grafted LDPE was first individually compounded into masterbatches. A final blend of CD grafted LDPE and closure liner composition (Polyliner 461, DS-Chemie, Bremen, Germany) was compounded to provide a CD loading of 0.50 wt % and 0.60 wt %. The final let down liner compositions with CD grafted polyolefin were further prepared prior to analysis for residual volatiles.

Two ethylene-maleic anhydride copolymer/LDPE blends were compounded with a stoichiometric weight loading of unmodified β-CD (3.20 wt %) using a Brabender Plasticorder Mixing Bowl forming the masterbatches. A third control sample of the closure liner composition was also compounded on a Brabender Plasticorder Mixing Bowl but without CD. All resins were dried at 85° C. for 2 hours under vacuum (<0.1" of Hg) before use, while β-CD cyclodextrin was dried in a circulating air oven at 105° C. for 30 minutes. The following master batch compositions were compounded.

Beta Cyclodextrin Compounding in Ethylene-Maleic Anhydride Copolymer/LDPE Blend (EMA/LDPE) Masterbatch One and thirty one hundredths gms of beta cyclodextrin (lot 70P162, Wacker Chemie) was compounded into 39.69 gms of EMA/LDPE (Plexar PX175, lot CL590803E1, Equistar Chemicals, L.P.) using a Brabender Plasticorder Mixing Bowl for 5 minutes at 130° C. and 80 rpm.

Beta Cyclodextrin Compounding in Low Density Polyethylene (LDPE) and Ethylene-Maleic Anhydride Copolymer/LDPE Blend (EMA/LDPE) Masterbatch One and thirty one hundredths gms of beta cyclodextrin (lot 70P162, Wacker Chemie) was compounded into 31.75 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

Test Compositions

A final test composition of CD grafted master batch and closure liner composition was made by compounding the materials in a Brabender Plasticorder Mixing Bowl. The wt % of the closure test compositions are provided in Table 3.

TABLE 3

CD grafted polyolefin and closure liner wt % compositions are compounded for organoleptic migrant testing.

| Sample ID | Description | CD Graft α-CD | CD Graft β-CD | Wt % Composition PX 175 | Wt % Composition PX 5125 | Wt % Composition Liner |
|---|---|---|---|---|---|---|
| 2A | Control | | | | | 100 |
| 2B | 0.50% α-CD Grafted Blend | X | | 3.7 | 14.8 | 81.5 |
| 2C | 0.60% α-CD Grafted Blend | X | | 4.5 | 17.8 | 77.7 |
| 2D | 0.50% β-CD Grafted Blend | | X | 3.7 | 14.7 | 81.6 |
| 2E | 0.60% β-CD Grafted Blend | | X | 4.4 | 17.7 | 77.9 |

Laboratory Sample Preparation

Granulated Polyliner 461 and CD grafted polyolefin masterbatch are dry-blend batch mixed on a weight basis. The dry-blended materials are dried in a vacuum oven at <0.1-mm Hg pressure for 2 hours at 85° C. to remove any residual water from both materials.

A Brabender fusion bowl was used to compound the CD grafted masterbatch and closure liner composition mixtures. Replicate 41-gram batches of pre-dried resins without CD grafted admixes are run to flush out the fusion bowl. The fusion bowl temperature was set at 130° C. With the rpm of the blades set at 80, 41 grams of test material composition is dropped into the bowl. The material is fed into the bowl over a 30-second period. After another 5 minutes of processing, the screw speed is reduced to zero and the molten resin is removed and collected on aluminum foil. The bowl and the roller blades are thoroughly cleaned before starting the next run.

Compounded liner test materials are then milled into shavings having ~20 Tm thickness for organoleptic resin volatiles testing.

Analytical Method

Aldehydes in the Brabender prepared test samples are allowed to out-gas from the resin into the headspace of a vial during confinement at an elevated temperature. An aliquot of air taken from the headspace during the confinement period is analyzed by static headspace gas chromatography using flame ionization detection.

A 0.25+/−0.002 g sample of milled shavings is placed into a 22-mL glass vial. The vial is immediately capped using a Teflon® faced butyl rubber septa and aluminum crimp top. Volatiles are desorbed from the sample into the headspace by heating the vial at 85° C. for 24-hours. The vial is transferred to a heated (85° C.) headspace sampler (Hewlett Packard model 19395A) attached to a Hewlett Packard Model HP-5880 II GC equipped with a flame ionization detector (FID), and computerized data collection. J&W Scientific capillary column (DB-5, 30 m×0.25 mm I.D., 1.0 μm film) with hydrogen carrier flow set at a split ratio of 20:1. HRGC is used to measure the acetaldehyde concentration in the headspace of the vial. The aldehyde peak area is integrated to quantitate the concentration, and then the concentration is calculated from a four-point standard calibration covering the concentration range of the samples. Sample concentrations are reported in ppm (μg/g—weight/weight). The aldehyde concentration is calculated from the calibration curve slope or response factor (RF) prepared for each aldehyde analyte.

$$\begin{matrix}\text{Concentration of}\\ \text{Compound in } ppm\end{matrix} = (\text{Peak Area } X \ RF) \div \text{Sample Wt.}$$

$$\begin{matrix}\text{Concentration of}\\ \text{Compound in } ppm\end{matrix} = \frac{\text{Peak Area}}{\text{Calibration Curve Slope}} \div \text{Sample Wt.}$$

Residual Aldehyde Test Results

When heated in a confined space, the closure test compositions produce part per billion and sub-part per billion levels of $C_4$ to $C_{10}$ aldehydes. Compositions containing CD grafted polyethylene substantially reduce the aldehyde concentrations. Total $C_4$ to $C_{10}$ aliphatic aldehydes were reduced 38% and 44% for 0.50 wt % and 0.60 wt % α-CD grafted compositions, respectively. The related wt % loadings for β-CD grafted compositions reduced total aldehydes 31 % and 22%, respectively.

TABLE 4

The table shows a comparison of $C_4$ to $C_{10}$ saturated aldehydes in closure liner material with and without CD grafted polyolefin. Aldehyde concentrations are in ng/g or parts per billion.

| | 2A | 2B | 2C | 2D | 2E |
|---|---|---|---|---|---|
| Decanal | 4.81 | 2.43 | 2.06 | 3.54 | 2.72 |
| Nonanal | 5.18 | 5.18 | 5.15 | 5.04 | 5.26 |
| Octanal | 358 | 208 | 185 | 236 | 275 |
| Heptanal | 0.79 | ND | 0.66 | 0.60 | 0.57 |
| Hexanal | 19.2 | 18.8 | 18.1 | 16.9 | 16.7 |
| Butanal | 29.5 | 25.3 | 22.0 | 26.4 | 25.7 |

Organoleptic Testing of Sealing Materials Exposed to Ozonated Water

Example III

Purified bottled water demand has increased sharply worldwide. The process known as ozonation is the commercial method for disinfecting bottle water in the North America. The most commonly used materials to manufacture bottles and closures are plastics such as polyethylene terephthalate (PET) for the bottle and polyolefins for liners and threaded closure shells. A "plastic-like" off-taste and off-odor is noticeable in water packaged in all plastic containers. This organoleptic defect is especially noticeable in water treated with ozone. Plastic off-taste in bottled water has be correlated with the presence of low level (typically part per billion) concentrations of aldehydes (e.g., hexanal, heptanal, octanal, nonanal, and decanal). Even before the liner or shell comes into contact with ozonated water, low aldehydes concentrations are inherent in the thermoplastic materials, as shown in Example 2, due to thermal oxidation degradation during processing. However, substantially greater aldehydes concentrations are measured in water which has been ozonated due to susceptible additives like erucamide, a common lubricant used in polyolefin sealing elements. Ozone chemically attacks unsaturated chemical bonds in additives and unsaturated olefin monomers (e.g., hexene, octene, decene) and oligomers. An accelerated storage testing method was used to measure aldehydes generated from liner compositions exposed to ozonated water. The test method with ozone treated water shows a further reduction in aldehydes can be achieved by incorporating CD grafted polyolefins into the closure composition.

Masterbatch Materials

CD grafted LDPE was first individually compounded into masterbatches. A final blend of CD grafted LDPE and closure liner composition (Polyliner 461, DS-Chemie, Bremen, Germany) was compounded to provide a CD loading of 0.50 wt %. The final let down liner compositions with CD grafted polyolefin were further prepared prior to accelerated ozonated water storage.

Two ethylene-maleic anhydride copolymer/LDPE blends were compounded with a stoichiometric weight loading of unmodified β-CD (3.30 wt %) using a Brabender Plasticorder Mixing Bowl forming the masterbatches. A third control sample of LDPE resin was also compounded on a Brabender Plasticorder Mixing Bowl containing unmodified α- and β-CD. All resins were dried at 85° C. for 2 hours under vacuum (<0.1" of Hg) before use, while β-CD cyclodextrin was dried at 105° C. for 30 minutes. The following masterbatch compositions were compounded.

Beta Cyclodextrin Compounding in Ethylene-Maleic Anhydride Copolymer/LDPE Blend (EMA/LDPE) Masterbatch One and thirty one hundredths gms of beta cyclodextrin (lot 70P162, Wacker Chemie) was compounded into 39.69 gms of EMA/LDPE (Plexar PX5125, lot CL590803E1, Equistar Chemicals, L.P.) or LDPE (NA204, lot ET626241, Equistar Chemicals, L.P.) using a Brabender Plasticorder Mixing Bowl for 5 minutes at 130° C. and 80 rpm.

One and thirty one hundredths gms of beta cyclodextrin (lot 70P162, Wacker Chemie) was compounded into 39.69 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

Alpha Cyclodextrin Compounding in Low Density Polyethylene (LDPE) and Ethylene-Maleic Anhydride Copolymer/LDPE Blend (EMA/LDPE) Masterbatch One and eleven hundredths gms of alpha cyclodextrin (lot 60P122, Wacker Chemie) was compounded into 39.89 gms of EMA/LDPE (Plexar PX5125, lot CL590803E1, Equistar Chemicals, L.P.) or LDPE (NA204, lot ET626241, Equistar Chemicals, L.P.) using a Brabender Plasticorder Mixing Bowl for 5 minutes at 130° C. and 80 rpm.

Alpha Cyclodextrin Compounding in Low Density Polyethylene (LDPE) and Ethylene-Maleic Anhydride Copolymer/LDPE Blend (EMA/LDPE) Masterbatch One and eleven hundredths gms of alpha cyclodextrin (lot 60P122, Wacker Chemie) was compounded into 31.75 gms of EMA/LDPE (Plexar PX5125, lot CL590803E1, Equistar Chemicals, L.P.) and 7.94 gms of EMA/LDPE (Plexar PX175, lot CL590803E1, Equistar Chemicals, L.P.) using a Brabender Plasticorder Mixing Bowl for 5 minutes at 130° C. and 80 rpm.

Closure Test Compositions

A final test composition of CD grafted master batch and closure liner composition was made compounding the materials in a Brabender Plasticorder Mixing Bowl for 5 minutes at 130° C. and 80 rpm. The wt % of the closure test compositions are provided in Table 5. This material was then molded into sample coupons 4.45 cm×1.59 cm×0.10 cm with an Atlas Laboratory Mixing Molder set at 140 rpm, 150° C. for 2 minutes, with a mold temperature of 90° C.

TABLE 5

CD grafted polyolefin, LDPE containing CD and closure liner wt % compositions.

| Sample ID | Description | Closure Liner | LDPE Masterbatch α-CD | LDPE Masterbatch β-CD | CD Grafted LDPE Masterbatch α-CD PX 175 | CD Grafted LDPE Masterbatch β-CD PX 175 | CD Grafted LDPE Masterbatch α-CD PX 5125 | CD Grafted LDPE Masterbatch β-CD PX 5125 |
|---|---|---|---|---|---|---|---|---|
| 3A | Control | | | | | | | |
| 3B | 0.50% α-CD | 81.5 | 18.5 | | | | | |
| 3C | 0.50% α-CD Grafted | 81.5 | | | | | 18.5 | |
| 3D | 0.50% α-CD Grafted Blend | 81.5 | | | 3.7 | | 14.8 | |
| 3E | 0.50% β-CD | 81.5 | | 18.5 | | | | |
| 3F | 0.50% β-CD Grafted | 81.6 | | | | | | 18.4 |
| 3G | 0.50% β-CD Grafted Blend | 81.6 | | | | 3.7 | | 14.7 |

Sample Preparation

A laboratory system to generate ozone includes passing pure oxygen from a feed gas (5.5 liters/min) into a corona discharge ozone generator producing high purity ozone. A continuous ozone monitor records the ozone generator output. Ozone is absorbed into the water yielding a substantial level of dissolved ozone gas in a given volume of water (approximately 800 ppb ozone). The ozone containing water is suitable for use in testing sealing element materials.

The test involves liner material test coupons containing the compositions provided in Table 5, which are exposed to water sterilized with 800 ppb ozone and stored in 500 mL glass bottles with 475 mL of ozonated DI water, metal screw caps with aluminum-faced liners. A 4.45 cm×1.59 cm×0.10 cm in test coupon is wedged into the mouth of the bottle. Bottles are stored on their sides where the ozone treated water is in direct contact with the test coupon for seven days at 40° C.

Analytical Method

Following the storage period, the aqueous contents are extracted 3 times with 30 mL methylene chloride, the methylene chloride extracts are dried through sodium sulfate drying columns, and the volume reduced to 0.5 mL using Kuderna-Danish evaporator. The internal standard acenaphthene (2 Tgm) was added to the reduced extract and, finally, the extracts are analyzed by high resolution gas chromatography using flame ionization detection. The aldehydes results are provided in Table 6.

Testing of Sealing Materials for Organoleptic Barrier

Example IV

A potent musty taint causing off-odor and off-flavor in beer, water and wine has been traced to an environmental contaminant called trichloroanisole (TCA). Sources of TCA have been traced containers of ships, wooden pallets, kraft paper bags and cardboard boxes. TCA is formed from chlorophenols, used in wood preserving, by fungal methylation. Concentrations of TCA as low as 5-10 ppt have been detected in aqueous solutions by trained panels and 20-30 ppt in untrained panels.

Organic Vapor Transport

Figure 3:
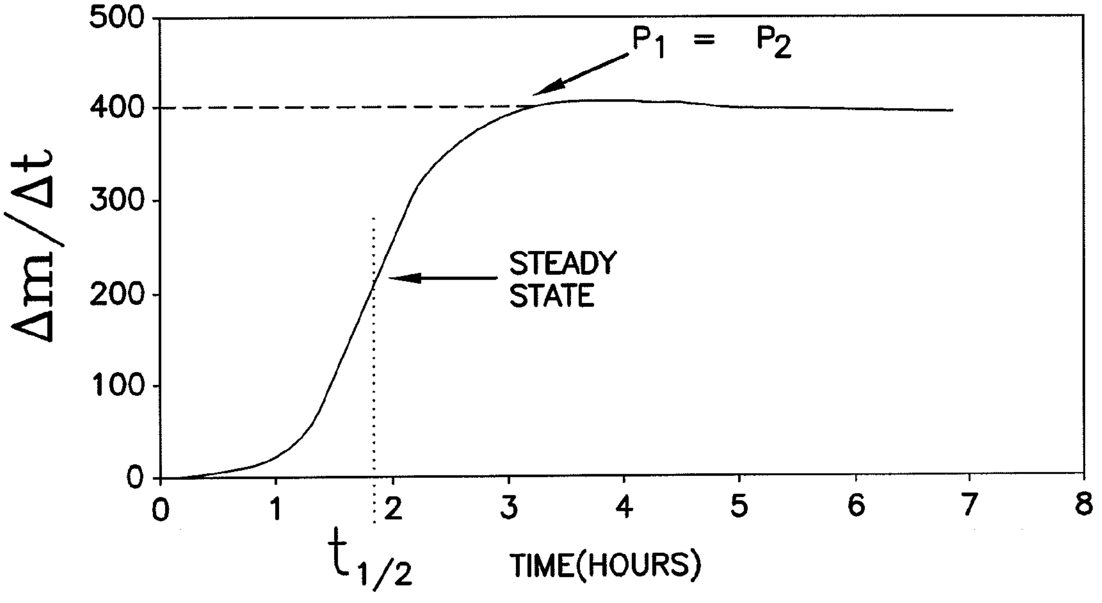
FIG. 3 is a drawing of a closed-volume permeation profile.
Figure 4:
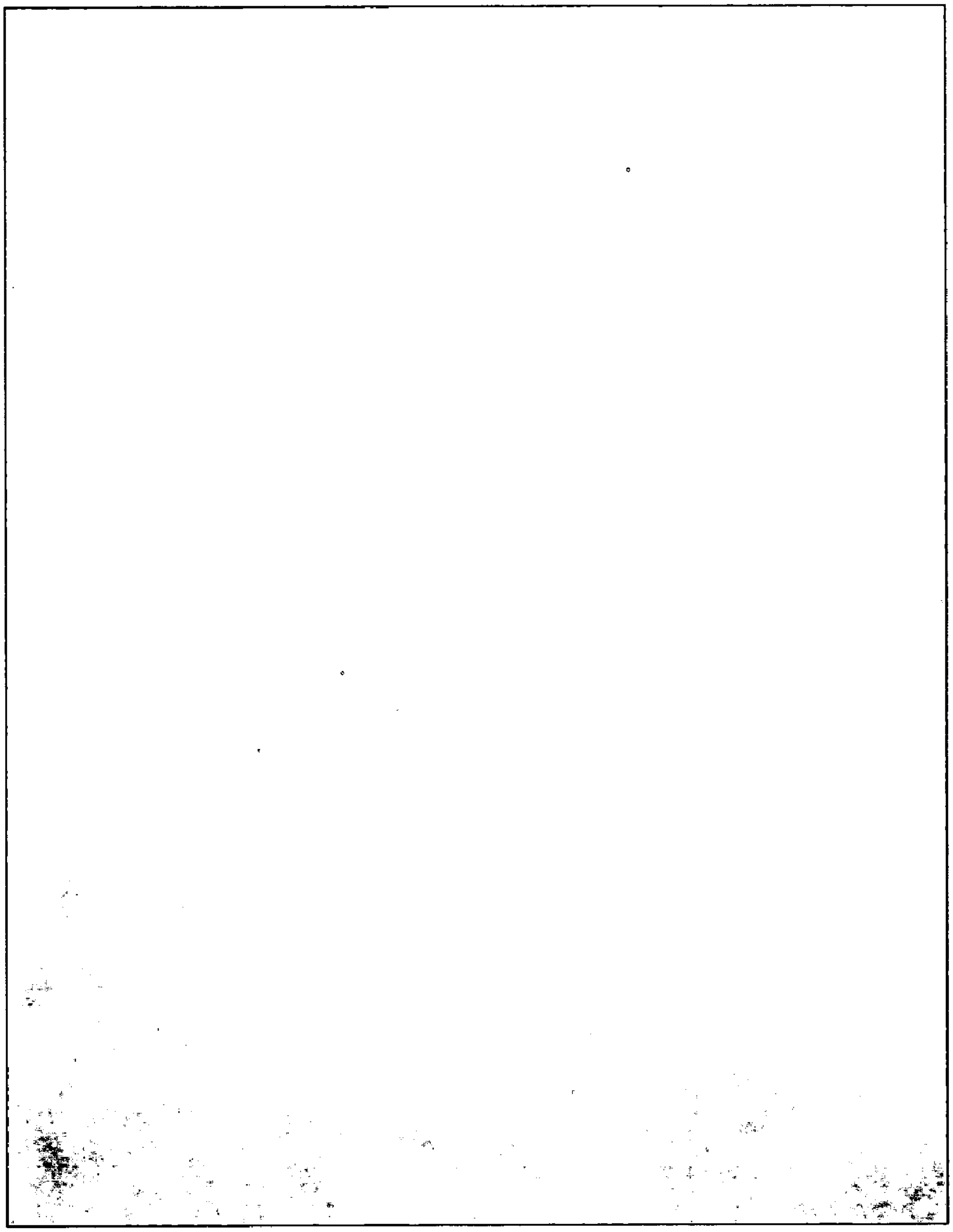
Figure 6:
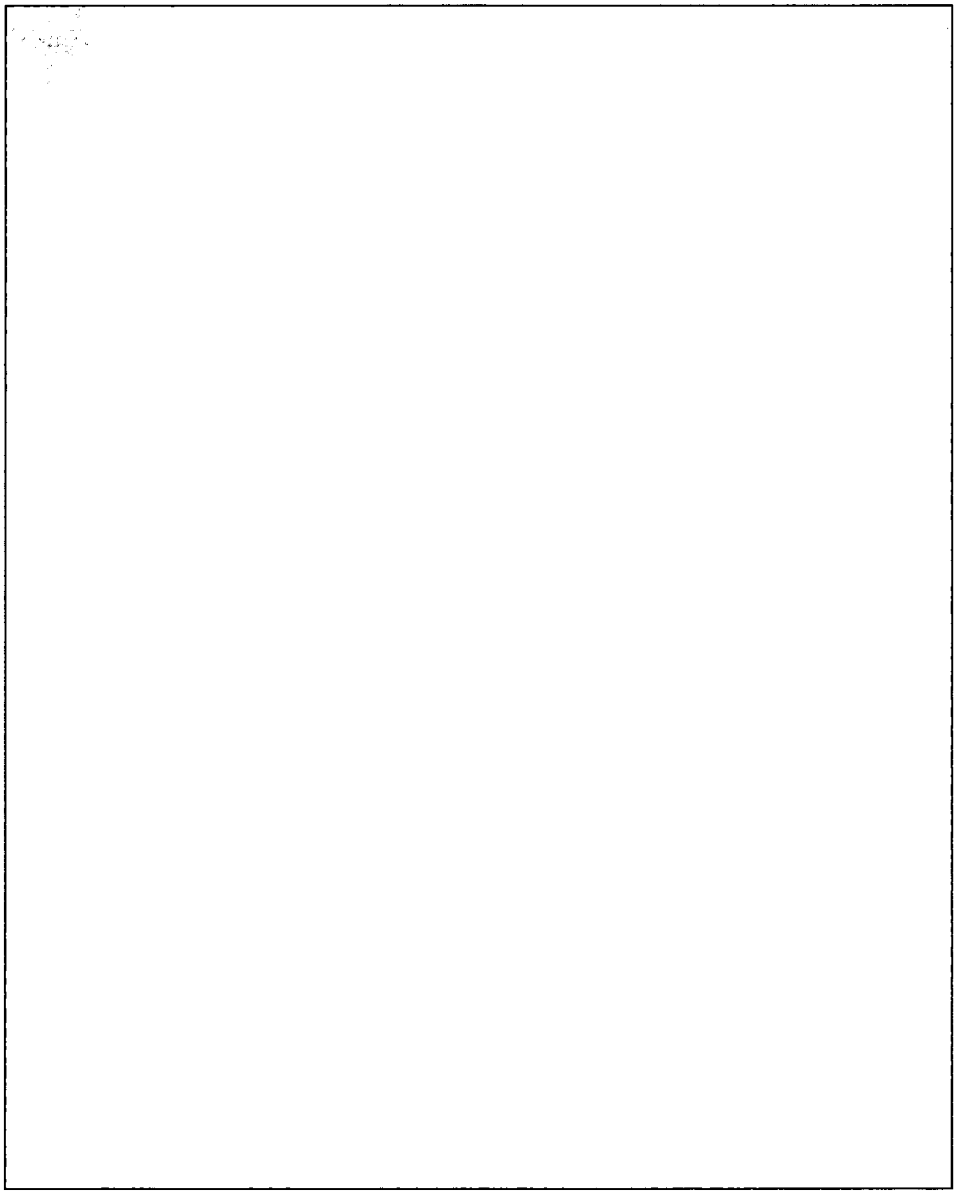

Permeation across a barrier can be explained where the membrane at time (t.sub.0) is initially free from permeant vapor. The penetrant pressure $p_2$ at the upstream face of the membrane is increased giving a concentration in the surface layer $c_2$. Diffusion is a measure of how quickly permeants move in a membrane across the concentration gradient and the time it takes to reach steady state. The downstream pressure, $p_1$, while measurable, is negligible at small times relative to the upstream pressure $p_2$. The amount of vapor permeating the film increases linearly with time once steady state has been reached. At large times, the upstream pressure p will equal the downstream pressure $p_1$. An illustrative transition profile is provided in FIG. 3.

TABLE 6

A comparison of aldehyde concentrations measured in ozone treated water in contact with closure liner compositions containing CD grafted LDPE and non-CD grafted LDPE. Aldehyde concentrations are μgm/L or parts per billion is shown.

| | ALDEHYDE CONCENTRATIONS IN OZONATED WATER 3A | 3B | 3C | 3D | 3E | 3F | 3G |
|---|---|---|---|---|---|---|---|
| tr-2-Decenal | 0.256 | 0.095 | 0.136 | 0.093 | 0.123 | 0.148 | 0.121 |
| Decanal | 0.105 | 0.012 | 0.070 | ND | 0.043 | 0.131 | 0.022 |
| Nonanal | 2.822 | 1.806 | ND | 1.655 | 3.268 | 2.175 | 2.467 |
| Octanal | 0.192 | ND | ND | ND | 0.017 | 0.082 | ND |

Figure 2:
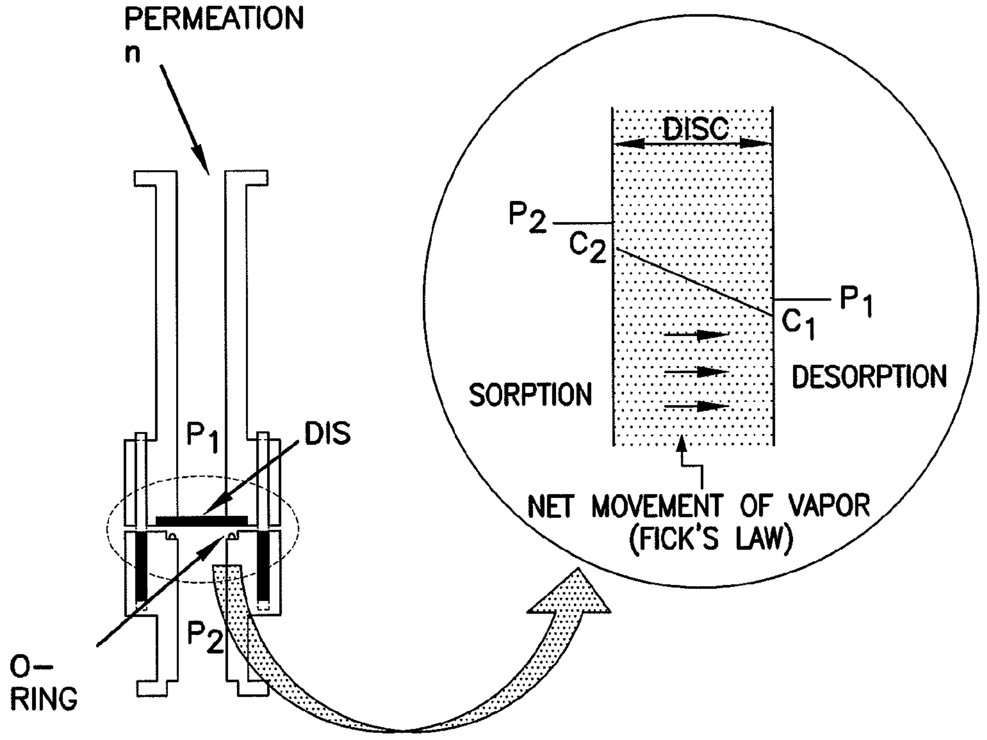
FIG. 2 is a schematic for a Organic Vapor Closed-Volume Static Permeation Cell.

The second objective is to show that a compatible cyclodextrin dispersed into PE then formed into a membrane retards organic vapor transport and reduces mass flux as measured in the static test cell in FIG. 2. Two experimental membranes are tested. The effect of cyclodextrin is measured in a monolayer liner composition membrane at diffusion time (t) when $p_2=p_1$ with TCA.

Masterbatch Materials

CD grafted LDPE was first individually compounded into masterbatches. A final blend of CD grafted LDPE and closure liner composition (Svelon 477, DS-Chemie, Bremen, Germany) was compounded to provide a CD loading of 0.50 wt % and 0.60 wt %. The final let down liner compositions with CD grafted polyolefin were further prepared prior to analysis for residual volatiles.

Two ethylene-maleic anhydride copolymer/LDPE blends (Plexar 1856, Equistar Chemicals, L.P.) were compounded with a stoichiometric weight loading of unmodified α-CD (3.91 wt %) and unmodified γ-CD (5.21 wt %) using a Brabender Plasticorder Mixing Bowl forming the masterbatches. All resins were dried at 85° C. for 2 hours under vacuum (<0.1" of Hg) before use, while the cyclodextrins were dried at 105° C. for 30 minutes.

Alpha Cyclodextrin Compounding in Ethylene-Maleic Anhydride Copolymer/LDPE Blend (EMA/LDPE)

One and six tenths gms of alpha cyclodextrin (lot 60P122, Wacker Chemie) was compounded into 39.4 gms of EMA/LDPE (Plexar PX1856, lot 51080101, Equistar Chemicals, L.P.) using a Brabender Plasticorder Mixing Bowl for 5 minutes at 150° C. and 80 rpm.

Gamma Cyclodextrin Compounding in Ethylene-Maleic Anhydride Copolymer/LDPE Blend (EMA/LDPE)

Two and fourteen hundredths gms of gamma cyclodextrin (lot 80P080, Wacker Chemie) was compounded into 38.86 gms of EMA/LDPE (Plexar PX1856, lot 51080101, Equistar Chemicals, L.P.) using a Brabender Plasticorder Mixing Bowl for 5 minutes at 150° C. and 80 rpm.

Test Compositions

A final test composition of CD grafted master batch and closure liner composition was made compounding the materials in a Brabender Plasticorder Mixing Bowl for 5 minutes at 130° C. and 80 rpm. This material was then molded into sample coupons 4.45 cm×1.59 cm×0.10 cm with an Atlas Laboratory Mixing Molder set at 140 rpm, 150° C. for 2 minutes, with a mold temperature of 90° C. The wt % of the closure test compositions are provided in Table 7.

TABLE 7

CD grafted polyolefin and closure liner wt % compositions are shown.

| Sample ID | Description | CD Graft α-CD | CD Graft γ-CD | Wt % Composition PX 1856 | Wt % Composition Liner |
|---|---|---|---|---|---|
| 4A | Control | | | | 100 |
| 4B | 0.50% α-CD Grafted | X | | 12.8 | 87.2 |

TABLE 7-continued

CD grafted polyolefin and closure liner wt % compositions are shown.

| Sample ID | Description | CD Graft α-CD | CD Graft γ-CD | Wt % Composition PX 1856 | Wt % Composition Liner |
|---|---|---|---|---|---|
| | | | | 3.6 | 81.7 |
| | | | | | 81.7 |
| 4C | 0.40% γ-CD Grafted | | X | 7.7 | 92.3 |
| 4D | 0.50% γ-CD Grafted | | X | 9.6 | 90.4 |

Mono-layer Disc Preparation

A 1.27-cm diameter punch is used to cut two discs from the 4.45 cm×1.59 cm×0.10 cm coupons for static permeation testing. Replicate sample thickness must be +/−5%

Analytical Method for Organic Vapor Permeation

The permeation method involves experimental techniques to measure organic molecule transport through a polymer packaging structure, using a static concentration gradient. High-resolution gas chromatography (HRGC) operated with electron capture detection (ECD) is used to measure the cumulative downstream penetrant concentration.

Apparatus

Figure 7:
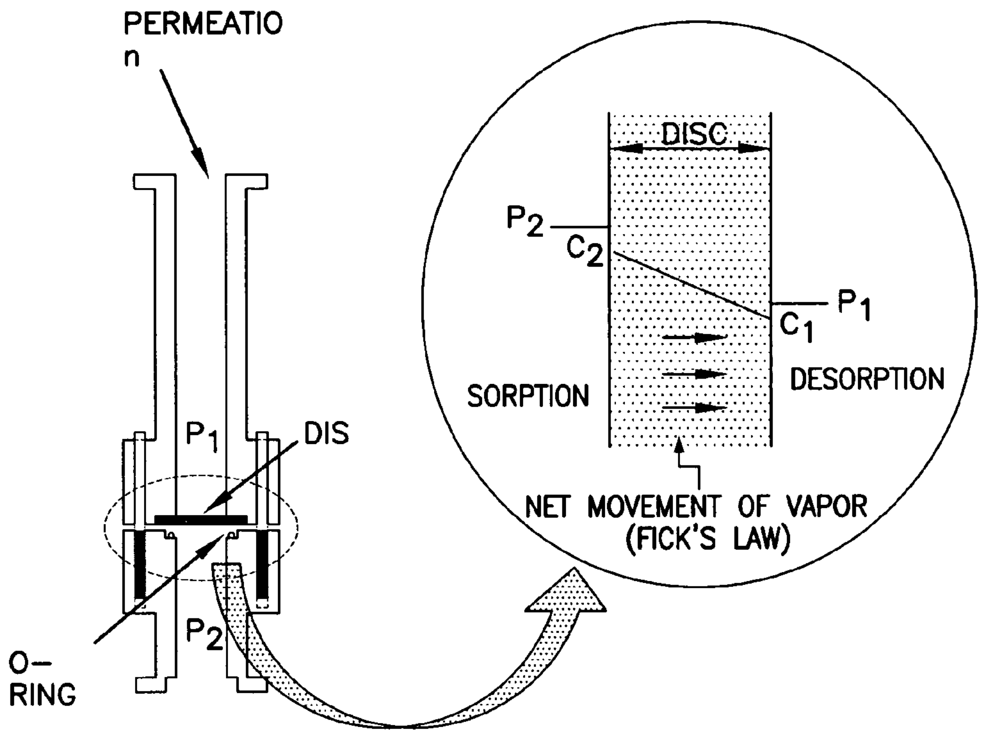
Figure 8:
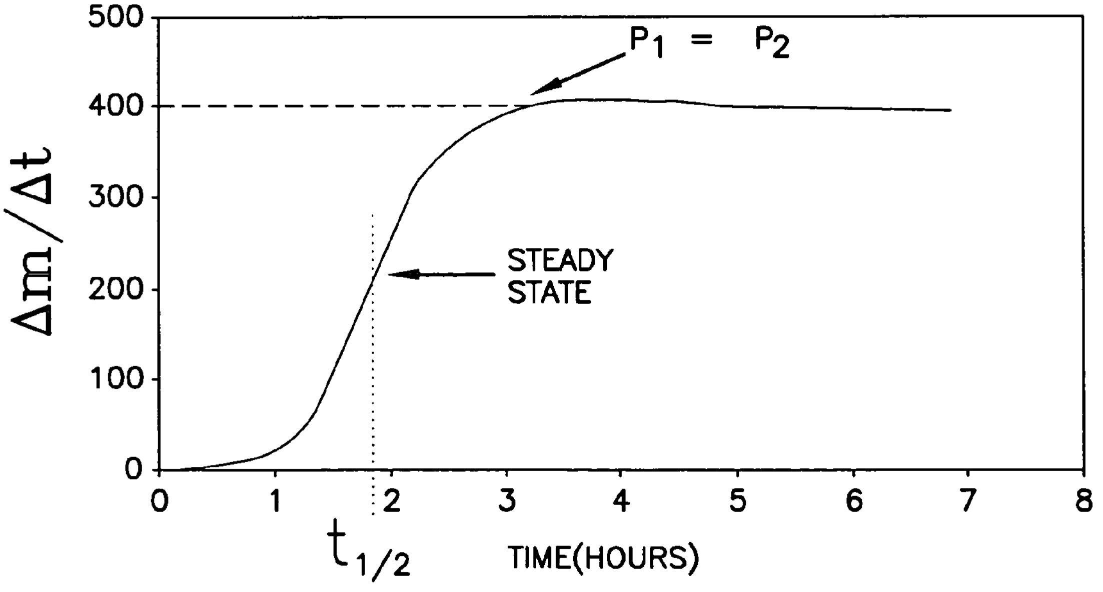

Disc samples (0.10 cm thick.times.1.27 cm diameter and weighing 128 mg) are tested in a closed-volume vapor permeation device (refer to FIG. 7). The experimental aluminum measurement cell has two compartments (i.e., cells) separated by the disc under study (effective disc area=5.3 cm.sup.2) and capped at both ends using Teflon.RTM. faced butyl rubber septa and aluminum crimp-tops.

The test disc is placed into the upper cell; the cell is assembled using an o-ring to firmly seal the test disc and screws to pull upper and lower cells together. Next, the upper cell is capped with a Teflon® faced butyl rubber septa and aluminum crimp-top. Two permeation standards are prepared. The permeant standard contains 2,4,6-trichloroanisole. The permeant is dispersed in a deionized water/surfactant mixture. The permeant water/surfactant mixture is injected into the lower cell providing a concentration $p_2$ at $t_0$ shown in Tables 8. TCA concentrations $p_2$ in the lower cell is expressed in parts per billion —nL/L (vol./vol.)—using gas laws. Then the lower cell is immediately capped with a Teflon® faced butyl rubber septa and aluminum crimp-top.

The standard concentrations of TCA were prepared by diluting a stock solution of TCA prepared in methanol at 50 mg/mL in a 1% Triton X 100 aqueous solution. The dilutions were prepared so that 5 uL additions of the diluted stock provided the masses (pg) to the test 20 mL headspace vials. The following SPME GC/ECD instrument conditions were used in the TCA analysis.

Column: DB-5 (40 meter by 0.18 mm id, 0.18 Tm film)
Carrier: Hydrogen
Headpressure: 22 psi (1 mL/min)
Inj. Mode: Splitless (1 min)
Inj. Temp: 270° C.
ECD Total Flow: 60 mL/min
ECD Temp: 275° C.
GC Oven Temp: 50° C. for 2 min 10° C./min to 225° C. for 0.5 min SPME Conditions: Heat @ 50° C. for 30 min Insert SPME for 30 min @ 50° C. SPME Fiber (blue, PDMS/DVB)

Trichloroanisole

HRGC operated with an ECD is used to measure the change in the cumulative trichloroanisole concentration at time $t_{1/2}$ in the upstream cell. An illustrative closed-volume static permeation profile is provided in FIG. 3. At the end of 6-hours, a sample is collected by solid phase microextraction (SPME) from the upper cell and analyzed by HRGC/ECD. The trichloroanisole concentration is determined from calibration standards and measured in pL/L or parts per trillion (vol./vol.) using gas laws. Test cells are prepared and analyzed in triplicate. Table 8 contains the concentration $p_2$ of TCA in the lower cell at t=0, and the concentration $p_1$ of TCA in the upper cell at time $t_{1/2}$ or 6-hours in the control and the triacetyl gamma cyclodextrin (TA-γ-CD) sample at two loadings.

TABLE 8

The concentration of trichloroanisole is measured by static permeation using headspace HRGC/ECD in a control closure composition containing CD grafted materials - permeation cell temperature maintained at 50° C.

| Permeant | Conc. $p_2$ @ Time = 0<br>All Samples µL/L | Concentration - $p_1$ @ Time = 6 Hours<br>4A pL/L | 4B pL/L | 4C pL/L | 4D pL/L |
|---|---|---|---|---|---|
| 2,4,6-Trichloroanisole | 1310 | 210 | 169 | 136 | 148 |
| Total | 1310 | 210 | 169 | 136 | 148 |

µL/L = Parts Per Million
pL/L = Parts Per Trillion

Closure compositions containing CD grafted material substantially reduced TCA mass transfer. TCA mass transfer was reduced 18.6% and 34.6% in liner composition compounded with 0.40 wt % and 0.50 wt % γ-CD grafted LDPE, respectively. γ-CD grafted LDPE at 0.50 wt % reduced TCA mass transfer 28.8%. TCA reduction is both a function of CD isomer (α, β or γ) and concentration.

Testing of Film Materials for Moisture Vapor Transport or Barrier Properties

Example V

For a specific package application or package design, it may be important to decrease water transport because of the sensitivity of the contents or to reduce film gauge for environmental reasons. High-density polyethylene (HDPE) films are commonly used in conjunction with bag-in-box food packaging applications to package cereals, crackers and snack foods. Moisture barrier in the flexible polyolefin structure plays an important role protecting these products from moisture ingress that can lead to sensory changes such as staling and loss of crispness, which shortens product shelf life. An improved moisture vapor barrier composition can comprise a thermoplastic web comprising a polyolefin polymer and a dispersed functional polyolefin that contains pendent cyclodextrin molecules.

Masterbatch Materials

An Ethylene-maleic anhydride copolymer (melt index 7.4 g/10 min and maleic anhydride functionality of 0.86 wt %) was compounded with a stoichiometric weight loading (5.0 wt %) of unmodified β-CD using a co-rotating compounding extruder (Warner Pfleiderer Corporation ZSK-30mm). It was configured with an upstream feed zone for the ethylene-maleic anhydride (EMA) copolymer and β-CD, followed by a mixing section, a feed zone for the HDPE, another mixing section with a melt seal, followed by a vacuum section and finally a conveying section and strand die. The EMA copolymer was dried for 6 hours at 95° C., at a pressure of <0.1 inches of Hg. The cyclodextrin was dried for 28 hours at 105° C., at a pressure of <0.1 inches of Hg. Weight loss feeders were used to deliver all materials. The cyclodextrin was kept under a nitrogen blanket to prevent moisture pickup. The feed zone was at ambient temperature (i.e.) about 22° C., first mixing zone was 150° C. the other zones were set at 125° C. The melt temperature at the die was 204° C. The extruder was operated at 300 rpm, and 61% of max torque. The output rate was 22.7 kg per hour. The β-CD was fed at 1.18 kg per hour, the EMA was fed at 10.18 kg per hour, and the HDPE was fed at 11.37 kg per hour. The cyclodextrin also contained a mixture of 3.1% Dynamar 5929 and 0.38% each of Irganox 1010 and Irgaphos 168. The EMA copolymer and the HDPE (Petrothene LM 6007) were obtained from Equistar; Irganox and Irgaphos antioxidants were obtained from Ciba Specialty Chemicals Corporation; Dynamar lubricant was obtained from the 3M Company, and the beta cyclodextrin was obtained from Wacker Biochem Corporation.

Film Preparation

HDPE (LM 6007) and the masterbatch formulation were converted into three films by blown film extrusion. The films were blown on a Killion laboratory scale blown film line. The extruder is equipped with a 25 mm diameter (24:1 L/D ratio) screw operated at 122 rpm with an output of 3.6 Kg/hour and pulled at two different speeds producing two different film gauges of 1.4 and 2.2 mil. The extruder is flood feed operated with virgin HDPE only as a control, and with the masterbatch formulation which was pre-blended with virgin HDPE resin by mechanical tumbling to provide two final CD weight compositions of 0.50 wt % and 0.35 wt %.

The blown film line annular film die has a 31.75-mm diameter and is operated at 211° C. The extruded polymer tube bubble has a diameter of 14.6 cm for both film thicknesses'. The two-extruder zones are operated at 226° C. and 227° C., respectively. The polymer melt temperature is 227 ° C. The extruder to film die adapter is operated at 227° C.

Water-Vapor Transmission

Water vapor permeates through polymers is much the same as other vapors. The efficacy of functionalized polyolefin containing pendent cyclodextrin molecules is determined by published ASTM methods (E 96 and F 1249) used to determine a rate of water vapor transmission, which is designated as the time rate of water vapor flow, under steady conditions, through unit area, under the relative humidity and temperature conditions of test. The accepted units are grams per day per meter squared ($g/(day \cdot m^2)$) or grams per day per hundred square inches ($g/(day \cdot 100\ in^2)$). The test is conducted until a steady state has been reached. Duplicate water vapor transmission rate (WVTR) test results are provided in Table 9 and 10. ASTM Method F 1249 was used to generated the WVTR test results in Tables 9 and WVTR test results in Table 10 were generated according to ASTM Method E 96, Procedure B—Water Method at 23° C. The following table comprises a comparison of water vapor transmission rates (WVTR) for a control high-density polyethylene (HDPE) film and β-CD grafted polyethylene in HDPE film using ASTM Method F 1249.

TABLE 9

| | Ave. Film Thickness (mils) ±0.05 | WVTR (WV Transmission Rate) The time rate of water vapor flow normal to surfaces, under steady-state conditions, per unit area gm/m$^2$ · day | gm/100 inch$^2$ · day |
|---|---|---|---|
| Control #1 | 1.92 | 3.07 | 0.198 |
| Control #2 | 2.24 | 2.90 | 0.187 |
| 0.35% β-CD Graft, Rep. #1 | 2.27 | 2.52 | 0.163 |
| 0.35% β-CD Graft, Rep. #2 | 2.25 | 2.53 | 0.163 |
| 0.50% β-CD Graft, Rep. #1 | 2.31 | 2.61 | 0.168 |
| 0.50% β-CD Graft, Rep. #2 | 2.59 | 2.51 | 0.162 |

Test temperature: 37.8° C. ± 0.3° C.
Test R.H.: 90%
Sample test area: 50 cm$^2$
Test result accuracy: ±3%
Test results corrected to 760 mm Hg
Average thickness based on five points distributed over the entire test piece The results in the forgoing table show a substantial reduction in the WVTR of the CD grafted polyolefin (0.35% and 0.50% CD) in HDPE (LM 6007) compared to the same HDPE (LM 6007) control without grafted CD. The improved water vapor barrier in the CD grafted films of the present invention using ASTM Test Method F 1249 is approximately 15% versus the control HDPE.

The following data show a comparison of water vapor transmission rates (WVTR) for a control high density polyethylene (HDPE) film and β-CD grafted polyethylene in HDPE film using ASTM Method E 96, Procedure B—Water Method at 23° C.

TABLE 10

| | Ave. Film Thickness (mils) ±0.05 | WVTR (WV Transmission Rate) The time rate of water vapor flow normal to surfaces, under steady-state conditions, per unit area gm/m$^2$ · day | gm/100 inch$^2$ · day |
|---|---|---|---|
| Control #1 | 1.39 | 0.484 | 0.031 |
| Control #2 | 1.40 | 0.496 | 0.032 |
| 0.50% β-CD Graft, Rep. #1 | 1.40 | 0.409 | 0.026 |
| 0.50% β-CD Graft, Rep. #2 | 1.40 | 0.393 | 0.025 |

Test temperature: 23° C. ± 0.5° C.
Test R.H.: 50%
Sample test area: 31.5 cm$^2$
Average thickness based on five points distributed over the entire test piece A substantial reduction in the WVTR of the 0.50% CD grafted polyolefin in HDPE (LM 6007) compared to the same HDPE (LM 6007) control without grafted CD. The improved water vapor barrier in the CD grafted films of the present invention using ASTM Test Method E 96 (Procedure B—Water Method at 23° C.) is approximately 18% versus the control HDPE.

The specification, figures, examples and data provide a detailed explanation of the invention as it has been developed to date. The invention, however, can take a number of embodiments without departing from the spirit or the intended scope of the invention. The invention and, therefore, resides in the claims hereinafter appended.

We claim:

1. A thermoplastic polymer composition, comprising a modified polyethylene, polypropylene or a poly(ethylene-co-propylene) resin comprising a polymethylene backbone comprising randomly substituted covalently bonded groups comprising a cyclodextrin compound; wherein an hydroxyl group of the cyclodextrin is bonded to the modified resin, and the cyclodextrin compound is substantially free of an inclusion compound in the central pore of the cyclodextrin ring.

2. The thermoplastic polymer composition of claim 1 wherein the modified polyethylene, polypropylene or a poly (ethylene-co-propylene) resin is derived from a polyethylene, polypropylene or a poly(ethylene-co-propylene) having a melt index of about 0,7 to 200 g-10 min.$^{-1}$

3. The thermoplastic polymer composition of claim 1 wherein the modified polyethylene, polypropylene or a poly (ethylene-co-propylene) resin comprises a maleic anhydride modified polyolefin wherein the maleic anhydride modified polyolefin comprises about 0.05 to 5 weight percent maleic anhydride and wherein the modified polyethylene, polypropylene or a polyethylene-co-propylene) resin comprises a melt index of about 1 to 75 g-10 min.$^{-1}$ and is derived from a polyolefin having a melt index of about 1 to 100 g-10 min.$^{-1}$

4. The thermoplastic polymer composition of claim 1 wherein the modified resin comprises a cyclodextrin bonded to a maleic anhydride modified polyolefin resin, and wherein the modified polyethylene, polypropylene or a poly(ethylene-co-propylene) resin comprises about 0.1 to 2 weight percent maleic anhydride.

5. The thermoplastic polymer composition of claim 1 wherein the modified polyethylene comprises a low-density polyethylene.

6. The thermoplastic polymer composition of claim 1 wherein the modified polyethylene comprises a linear low-density polyethylene.

7. The thermoplastic polymer composition of claim 1 wherein the modified polyethylene comprises a high-density polyethylene.

8. The thermoplastic polymer composition of claim 1 wherein the modified polyethylene, polypropylene or a poly (ethylene-co-propylene) resin comprises a cyclodextrin bonded to an epoxy modified polyolefin.

9. The thermoplastic polymer composition of claim 1 wherein the substituent comprises azido, amino, acetylamino, alkylamino, hydroxyalkyl, heterocyclyl, alkylsulfonate, hydroxyalkylthio, or aminoalkylthio.

10. The thermoplastic composition of claim 1 wherein the modified resin comprises a packaging grade vinyl polymer.

11. The thermoplastic composition of claim 1 wherein the composition has a higher percent of crystallinity than the polyolefin without cyclodextrin.

12. The thermoplastic composition of claim 1 wherein the composition has a higher polarity and a lower equilibrium partition coefficient than the polyolefin without cyclodextrin.

13. The thermoplastic composition of claim 1 wherein the composition has selective barrier properties.

14. The thermoplastic composition of claim 1 further comprising a thermoplastic resin comprising a poly(ethylene-co-vinyl acetate), polyvinyl chloride, polyvinylidene chloride, butyl rubber, styrene-butadiene rubber, or acrylic rubber.

15. The thermoplastic composition of claim 1 further comprising a lubricant, an antistatic agent, a plasticizer, a heat stabilizer, an antioxidant, or a pigment.

* * * * *